United States Patent
Lee et al.

(10) Patent No.: US 11,475,423 B2
(45) Date of Patent: Oct. 18, 2022

(54) GENERATION OF BILLING INFORMATION USING JOB INFORMATION OF CONTENT

(71) Applicant: Hewlett-Packard Development Company, L.P., Spring, TX (US)

(72) Inventors: Hyun Suk Lee, Seongnam-si (KR); Min Hyun Kim, Seongnam-si (KR); Seon Ae Park, Seongnam-si (KR); Su Dong Kim, Seongnam-si (KR); Yun Jong Lee, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 343 days.

(21) Appl. No.: 16/638,605

(22) PCT Filed: Jun. 20, 2018

(86) PCT No.: PCT/KR2018/006935
§ 371 (c)(1),
(2) Date: Feb. 12, 2020

(87) PCT Pub. No.: WO2019/066197
PCT Pub. Date: Apr. 4, 2019

(65) Prior Publication Data
US 2020/0175486 A1    Jun. 4, 2020

(30) Foreign Application Priority Data
Sep. 29, 2017 (KR) .................. 10-2017-0128311

(51) Int. Cl.
*G06Q 20/14* (2012.01)
*G06F 3/0482* (2013.01)
(Continued)

(52) U.S. Cl.
CPC ............ *G06Q 20/14* (2013.01); *G06F 3/0482* (2013.01); *G06F 3/122* (2013.01); *G06F 3/1204* (2013.01);
(Continued)

(58) Field of Classification Search
CPC ....... G06Q 20/14; H04N 1/342; G06F 3/1273
(Continued)

(56) References Cited

U.S. PATENT DOCUMENTS 8,738,480 B2     5/2014 Ray
2005/0174594 A1*  8/2005 Cherry .................. G06Q 30/04
                                              358/1.14

(Continued)

FOREIGN PATENT DOCUMENTS

JP      11-134057 A     5/1999
JP      2006-88382 A    4/2006
JP      2006-150799 A   6/2006

OTHER PUBLICATIONS

Samsung Electronics Co., Ltd., 'Smart Printing Kiosk', Jun. 23, 2017 <https://smartus.samsung.com/home?app=208#>.

*Primary Examiner* — Jacky X Zheng
(74) *Attorney, Agent, or Firm* — Jefferson IP Law, LLP

(57) ABSTRACT

A printing method performed by an image forming apparatus is provided. The image forming apparatus receives job information of content, and generates payment amount information based on the job information of the content. The image forming apparatus receives payment method information from a user, and generates billing information by using the payment amount information and the payment method information. The image forming apparatus transmits the billing information to a payment system.

20 Claims, 25 Drawing Sheets

(51) Int. Cl.
*G06F 3/12* (2006.01)
*G06Q 30/04* (2012.01)
*H04N 1/34* (2006.01)

(52) U.S. Cl.
CPC .......... *G06F 3/1239* (2013.01); *G06F 3/1255* (2013.01); *G06F 3/1273* (2013.01); *G06Q 30/04* (2013.01); *H04N 1/342* (2013.01)

(58) Field of Classification Search
USPC ...................................................... 358/1.15
See application file for complete search history.

(56) References Cited

U.S. PATENT DOCUMENTS

| | | | |
|---|---|---|---|
| 2007/0220269 A1 | 9/2007 | Suzuki | |
| 2009/0144182 A1 | 6/2009 | Matsuda et al. | |
| 2010/0241541 A1* | 9/2010 | Ito | G06Q 30/04 |
| | | | 705/412 |
| 2014/0320883 A1* | 10/2014 | Ichida | G06F 21/31 |
| | | | 358/1.14 |
| 2017/0118378 A1 | 4/2017 | Tsujimoto et al. | |
| 2017/0337016 A1* | 11/2017 | Lee | G06Q 20/14 |

* cited by examiner

FIG. 6
| PAYMENT METHOD | PROTOCOL | IP ADDRESS | PORT | URL | Timeout | ICON | CARD READER |
|---|---|---|---|---|---|---|---|
| CASH | HTTP | 10.25.66.66 | 3232 | | 60 |  | UNAVAILABLE |
| CREDIT CARD | HTTP | 127.0.0.1 | 80 | /pps/third.aj /payment | 10 |  | AVAILABLE |
| ACCOUNT TRANSFER | SOCKET | 10.220.201.137 | 61300 | | 60 |  | UNAVAILABLE |
| TRANSPORTATION CARD | HTTPS | 10.22.33.33 | 4444 | | 60 |  | AVAILABLE |

FIG. 7

| | XOA | Basic Price | | Apply | Undo |
|---|---|---|---|---|---|
| | ▼ Smart Printing Kiosk | | | | |
| | General Settings | | | *Denotes a required field | |
| 701 | Basic Price | | | | |
| | Specific Prices | Currency Unit*? | WON (KRW) | | |
| | Payment methods | Currency Unit Position | Suffix ▶ | | |
| | Ectemal Properties | Number of Decimal Places ? | 0 ▶ | | |
| | | Unit Costs*? | | | |

702, 703, 704

| | Copy | Scan | Print | Fax |
|---|---|---|---|---|
| Color | 20 | 20 | 100 | – |
| Mono | 10 | 10 | 30 | 10 |

705

100

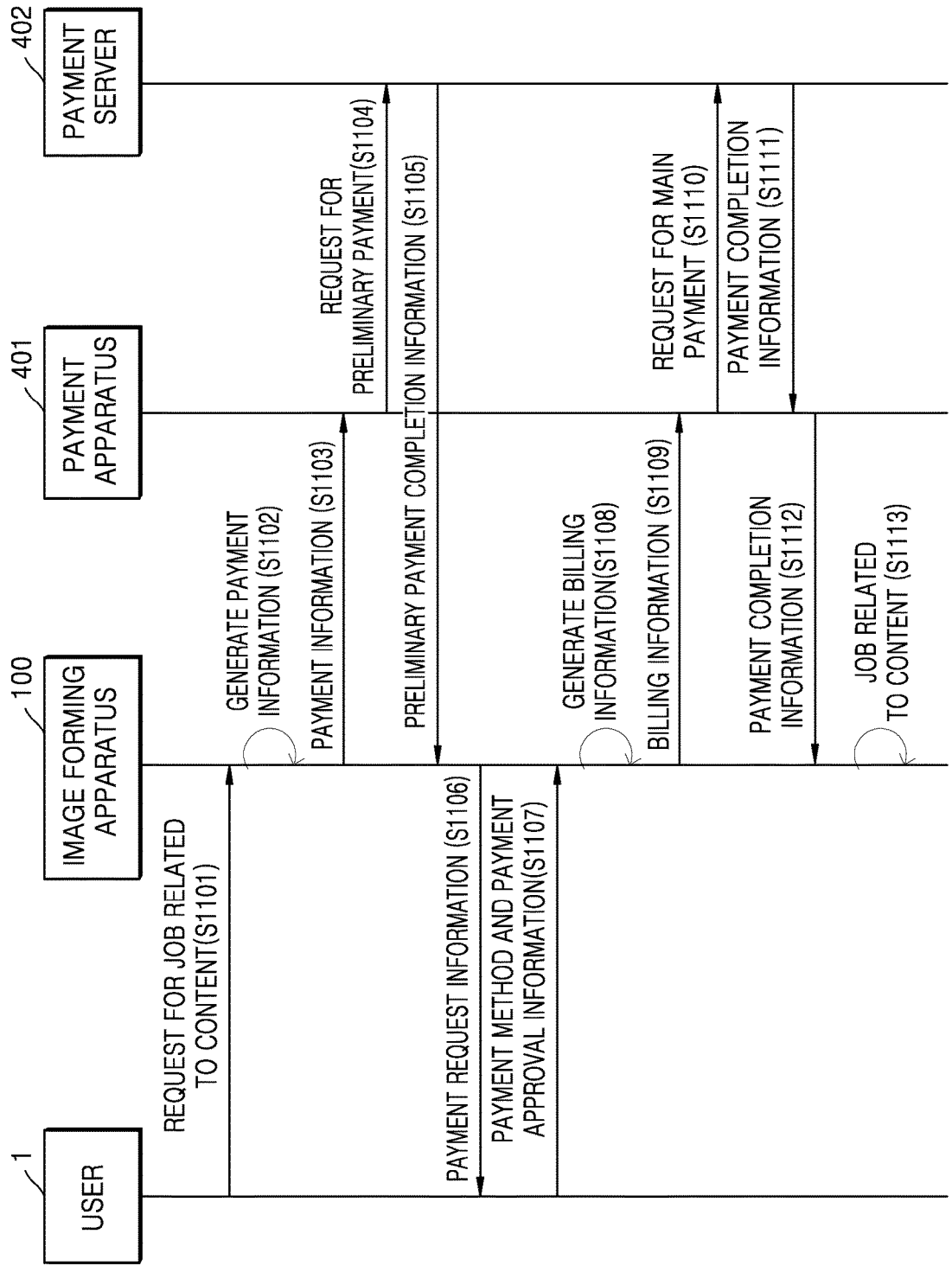

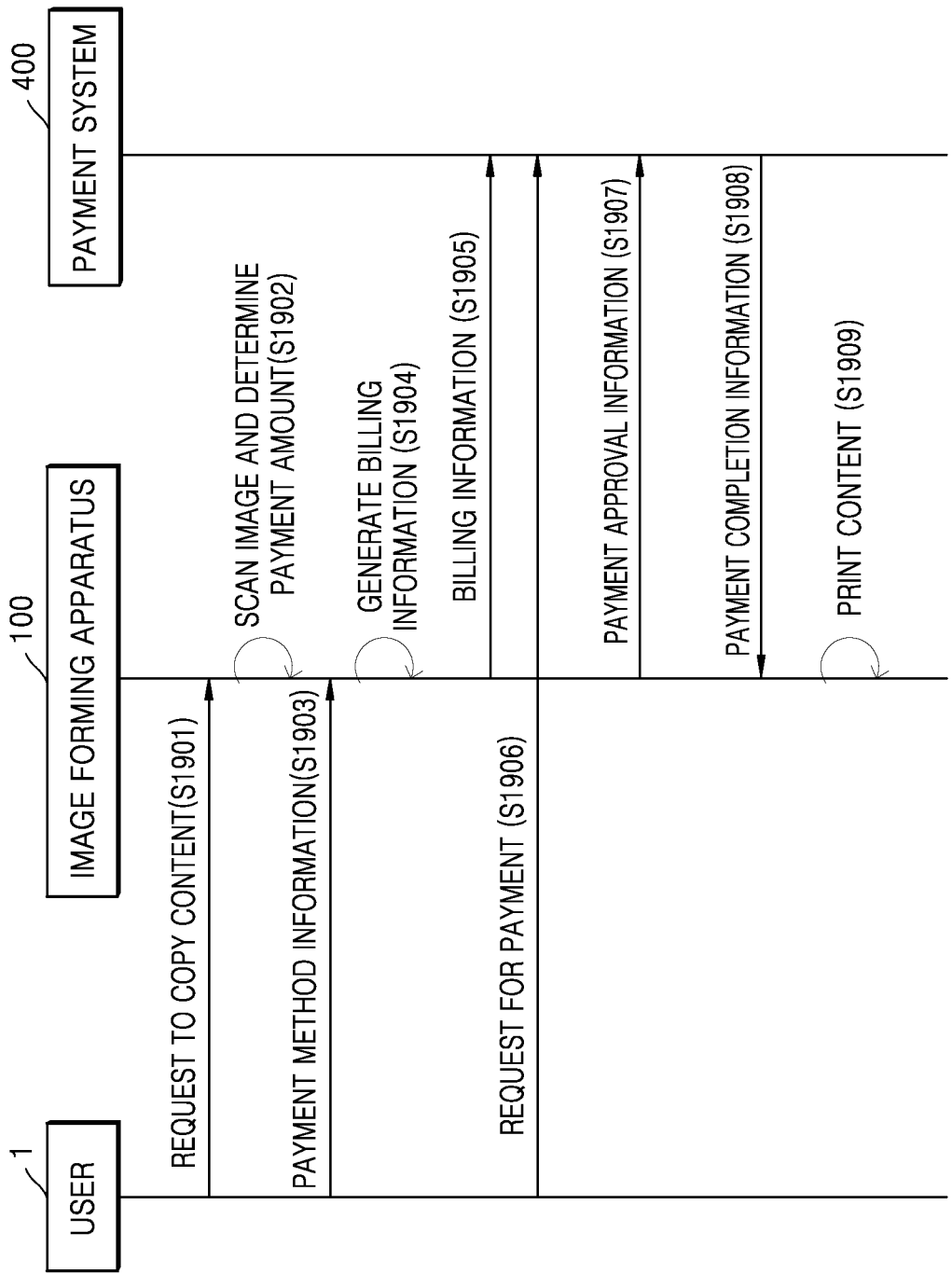

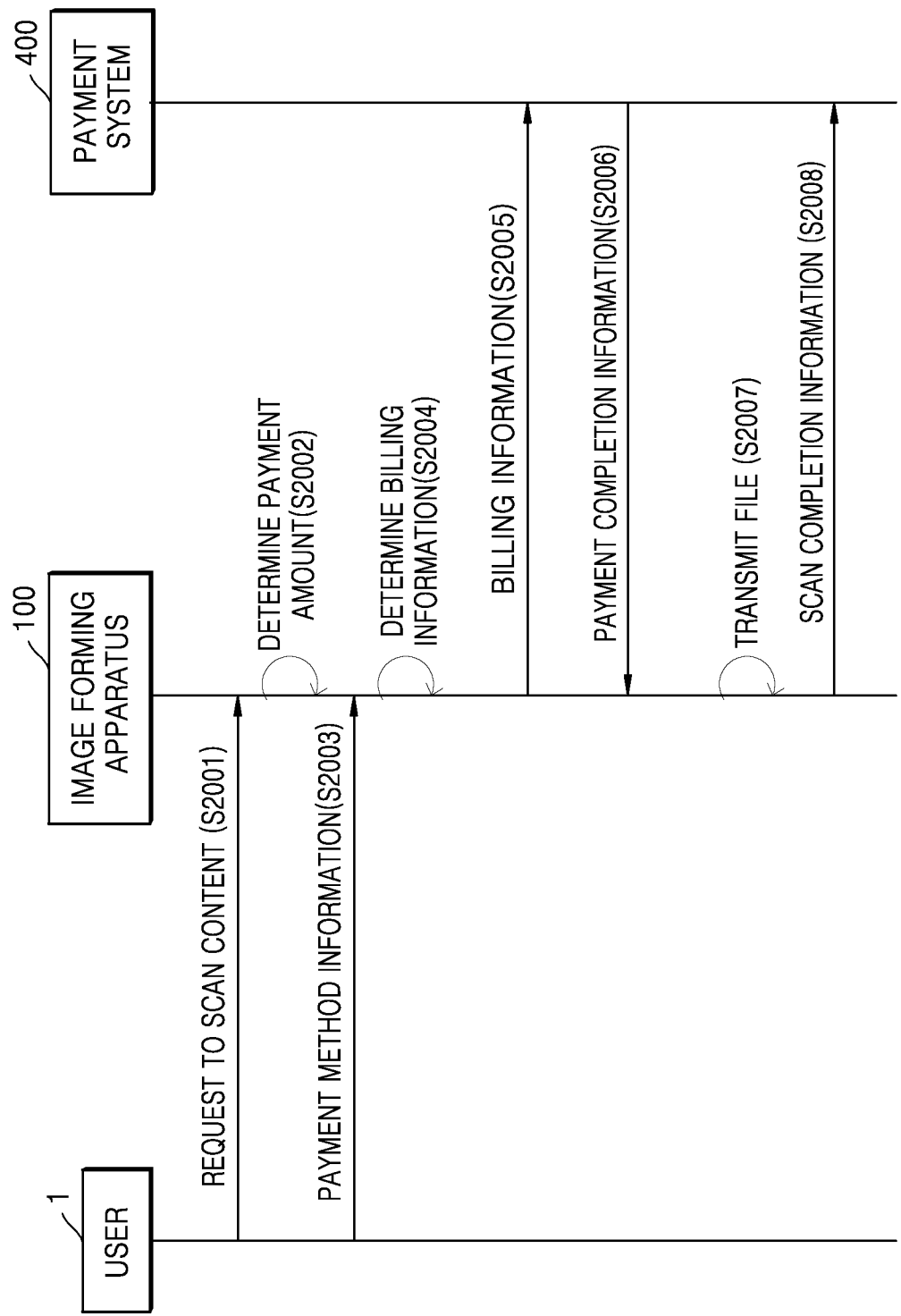

GENERATION OF BILLING INFORMATION USING JOB INFORMATION OF CONTENT

BACKGROUND ART

In an environment using a charged image forming apparatus, when a user transmits content desired to be printed from an external apparatus (for example, a personal computer (PC)) to an image forming apparatus, an employee providing a print service may print the content by using the image forming apparatus and provide a printout to the user when payment is made according to a print option (for example, the number of copies or color printing).

BRIEF DESCRIPTION OF DRAWINGS

FIG. 6 is a diagram for describing communication information and identification (ID) information corresponding to a payment method according to an example;

FIG. 7 is a diagram for describing payment amount setting information according to an example;

FIG. 11 is a flow diagram of a system for performing a job related to content according to an example;

FIG. 19 is a flow diagram of a system for copying content according to an example; and FIG. 20 is a flow diagram of a system for scanning content according to an example.

MODE FOR THE INVENTION

Hereinafter, various examples will be described with reference to accompanying drawings. The examples described may be modified and have different forms. For a clearer description of features of the examples, detailed descriptions related to technologies well-known to one of ordinary skill in the art are omitted.

In the specification, when a component is "connected" to another component, the component may be "directly connected" to the other component, or may be "connected" to the other component "via another component therebetween." Also, when a component "includes" another component, the component may further include other components unless indicated otherwise.

In the specification, an "image forming job" may denote any one of various jobs (for example, copying, printing, scanning, and faxing) related to an image, such as forming of an image or generating/storing/transmitting of an image file, and a "job" may denote not only an image forming job, but may also denote a series of processes required to perform the image forming job.

Also, an "image forming apparatus" may denote any apparatus capable of performing an image forming job, such as a printer, a scanner, a fax machine, a multi-function printer (MFP), or a display device.

Also, "content" may denote any type of data that is a target of an image forming job, such as a photograph, an image, or a document file.

Also, "print data" may denote data converted to data in a format printable by a printer. In this case, "content" may include content converted to content in a format printable by a printer. For example, printing content means content in a format of print data.

Also, a "scan file" may denote a file generated by scanning an image by a scanner.

Also, a "user" may denote a person who performs manipulation related to an image forming job by using an image forming apparatus or a device connected to the image forming apparatus wirelessly or via wires.

Figure 1:
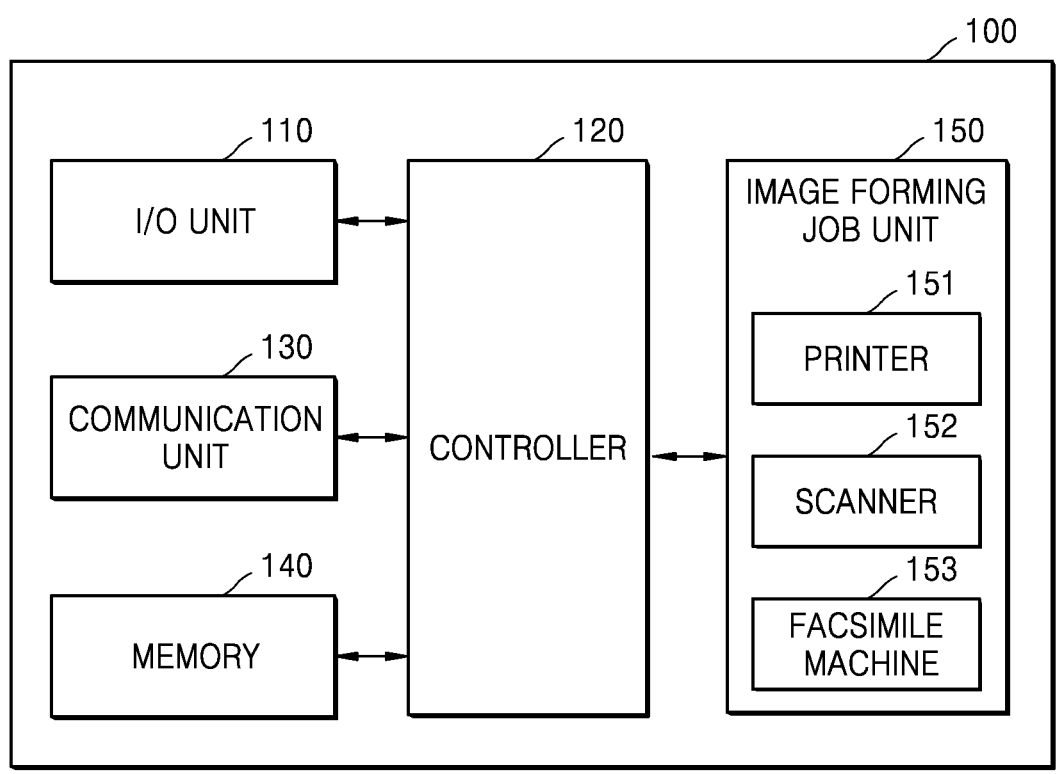
FIG. 1 is a diagram of a configuration of an image forming apparatus according to an example.

FIG. 1 is a diagram of a configuration of an image forming apparatus according to an example.

Figure 2:
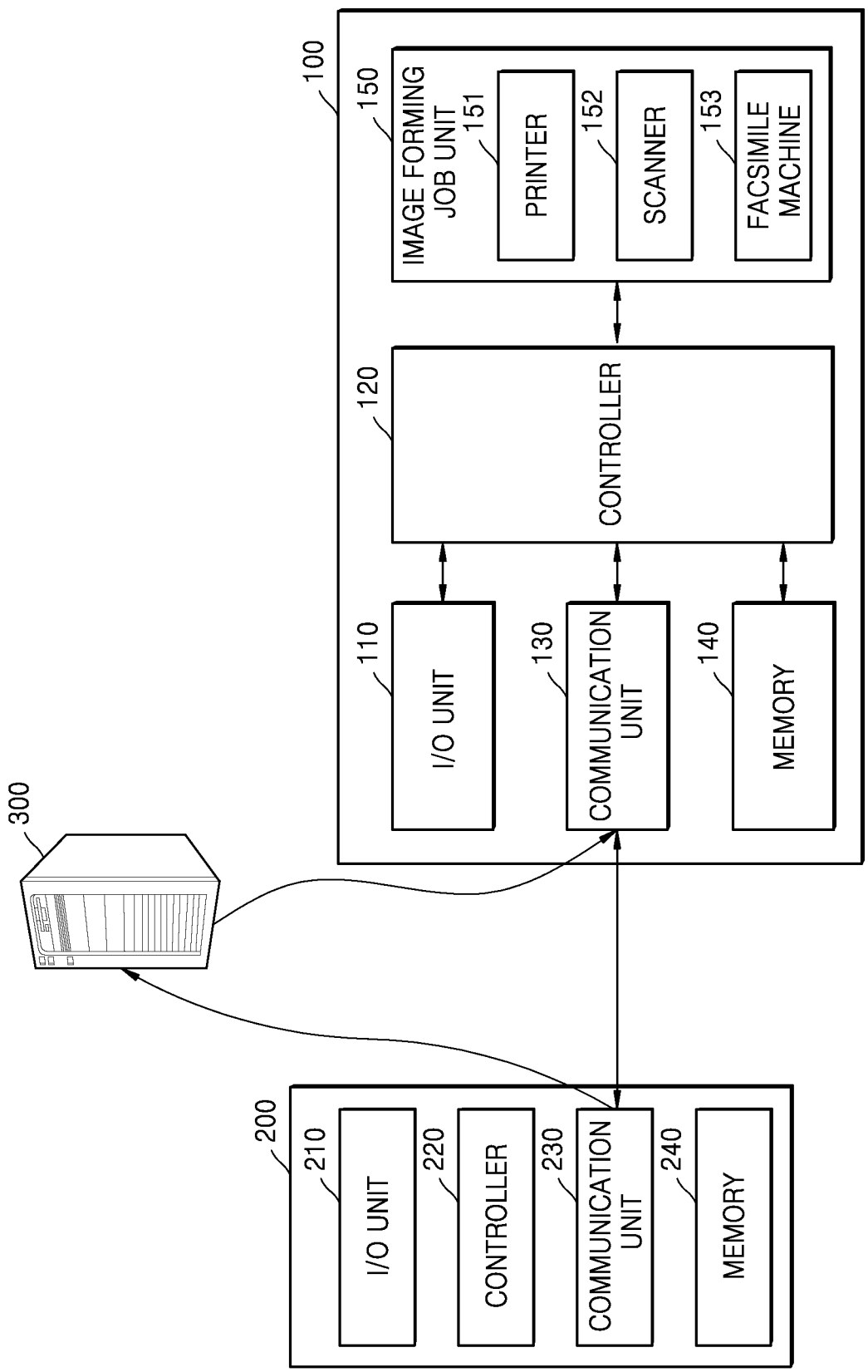
FIG. 2 is a diagram of a system environment according to an example.

FIG. 2 is a diagram of a system environment according to an example.

Referring to FIG. 1, an image forming apparatus 100 may include an input/output (I/O) unit 110, a controller 120, a communication unit 130, a memory 140, and an image forming job unit 150. Also, although not illustrated, the image forming apparatus 100 may further include a power supply for supplying power to each component. Also, the image forming apparatus 100 may be an apparatus including an eXtensible Open Architecture (XOA), i.e., an open platform.

The I/O unit 110 may include an input unit for receiving an input of performing an image forming job from a user, and an output unit for displaying a result of performing the image forming job or information about a state of the image forming apparatus 100. For example, the I/O unit 110 may include an operation panel for receiving a user input and a display panel for displaying a screen.

In more detail, the input unit may include a device capable of receiving various types of user input, such as a keyboard, a physical button, a touch screen, a camera, or a microphone. Also, the output unit may include a display panel or a speaker. However, the I/O unit 110 is not limited thereto, and may include an apparatus supporting various inputs and outputs.

The I/O unit 110 may include an independent control system. In other words, separate from the controller 120 of the image forming apparatus 100, the I/O unit 110 may include a control system (e.g., a controller and a memory) for controlling a user interface (UI) provided by the I/O unit 110. The control system of the I/O unit 110 may include an operating system (OS) for providing a UI and programs, such as applications, for supporting various functions.

The controller 120 may control overall operations of the image forming apparatus 100, and may include a processor, such as a central processing unit (CPU). The controller 120 may control other components included in the image forming apparatus 100 to perform an operation corresponding to a user input received through the I/O unit 110.

For example, the controller 120 may execute a program stored in the memory 140, read a file stored in the memory 140, or store a new file in the memory 140.

When job information about printing of content and identification (ID) information are received from an external apparatus or a server connected to the external apparatus through the communication unit 130, ID information is received from a user through an input unit of the I/O unit 110. If the ID information received from the user and the received ID information correspond to each other, the controller 120 may control the communication unit 130 to transmit billing information based on the job information to a payment system. When payment completion information according to payment of the user is received through the communication unit 130, the controller 120 may print the content based on the job information.

The ID information received through the input unit and the ID information received through the communication unit 130 may be determined to correspond to each other when they match each other.

The controller 120 may control the communication unit 130 to transmit content print completion information according to completion of printing of the content to the payment system.

When the ID information received through the input unit and the ID information received through the communication unit 130 correspond to each other, the controller 120 may control the output unit of the I/O unit 110 to display a job information list including the job information, and when the job information is selected from the job information list, the controller 120 may control the communication unit 130 to transmit the billing information based on the job information to the payment system.

The communication unit 130 may communicate with another device or a network via wired or wireless communication. In this regard, the communication unit 130 may include a communication module supporting at least one of various wired/wireless communication methods. For example, the communication module may be in a form of a chipset, or may be a sticker/barcode (for example, a sticker including a near field communication (NFC) tag) containing information required for communication.

The wireless communication may include at least one of, for example, wireless fidelity (Wi-Fi), Wi-Fi direct, Bluetooth, ultra wideband (UWB), and NFC. The wired communication may include at least one of, for example, a universal serial bus (USB) and a high definition multimedia interface (HDMI).

The communication unit 130 may be connected to an external apparatus 200 located outside the image forming apparatus 100 so as to transmit or receive a signal or data. Referring to FIG. 2, the image forming apparatus 100 may be connected to the external apparatus 200 through the communication unit 130. The communication unit 130 may transmit a signal or data received from the external apparatus 200 to the controller 120, or transmit a signal or data generated by the controller 120 to the external apparatus 200. For example, when the communication unit 130 receives a print command signal and print data from the external apparatus 200, the controller 120 may output the received print data through a printer 151.

As illustrated in FIG. 2, the image forming apparatus 100 may be connected to the user terminal 200 or a server 300.

As shown in FIG. 2, the external apparatus 200 may include an I/O unit 210, a controller 220, a communication unit 230, and a memory 240. The controller 220 may control an image forming job by executing a program stored in the memory 240 and transmitting a signal or data generated as a result to the image forming apparatus 100 through the communication unit 230. The external apparatus 200 may include, for example, a smart phone, a tablet personal computer (PC), a PC, a home appliance, a medical device, a camera, or a wearable device.

The communication unit 130 may be directly connected to the server 300 to transmit or receive a signal or data. Also, the communication unit 130 may be connected to the external apparatus 200 through the server 300. In other words, the communication unit 130 of the image forming apparatus 100 may transmit or receive a signal or data to and from the communication unit 230 of the external apparatus 200 through the server 300.

Referring back to FIG. 1, various types of data, such as programs (for example, applications) and files, may be installed or stored in the memory 140. The controller 120 may access and use the data stored in the memory 140 or store new data in the memory 140. Also, the controller 120 may execute a program stored in the memory 140. Also, the controller 120 may install an application received from an external source through the communication unit 130 in the memory 140.

The image forming job unit 150 may perform an image forming job, such as copying, printing, scanning, or faxing.

In the example of FIG. 1, the image forming job unit 150 includes the printer 151, a scanner 152, and a facsimile machine 153, but the image forming job unit 150 may include only some of them or may further include a component for performing another type of image forming job according to needs.

The printer 151 may form an image on a recording medium via any one of various printing methods, such as an electro-photography method, an inkjet method, a thermal transfer method, and a thermo-sensitive method.

The scanner 152 may irradiate light onto paper and read an image recorded on the paper by receiving light reflected from the paper.

In the facsimile machine 153, a component for scanning an image may be shared with the scanner 152, and a component for printing a received file may be shared with the printer 151. The facsimile machine 153 may transmit a scan file to a destination or receive a file from an external source.

Figure 3:
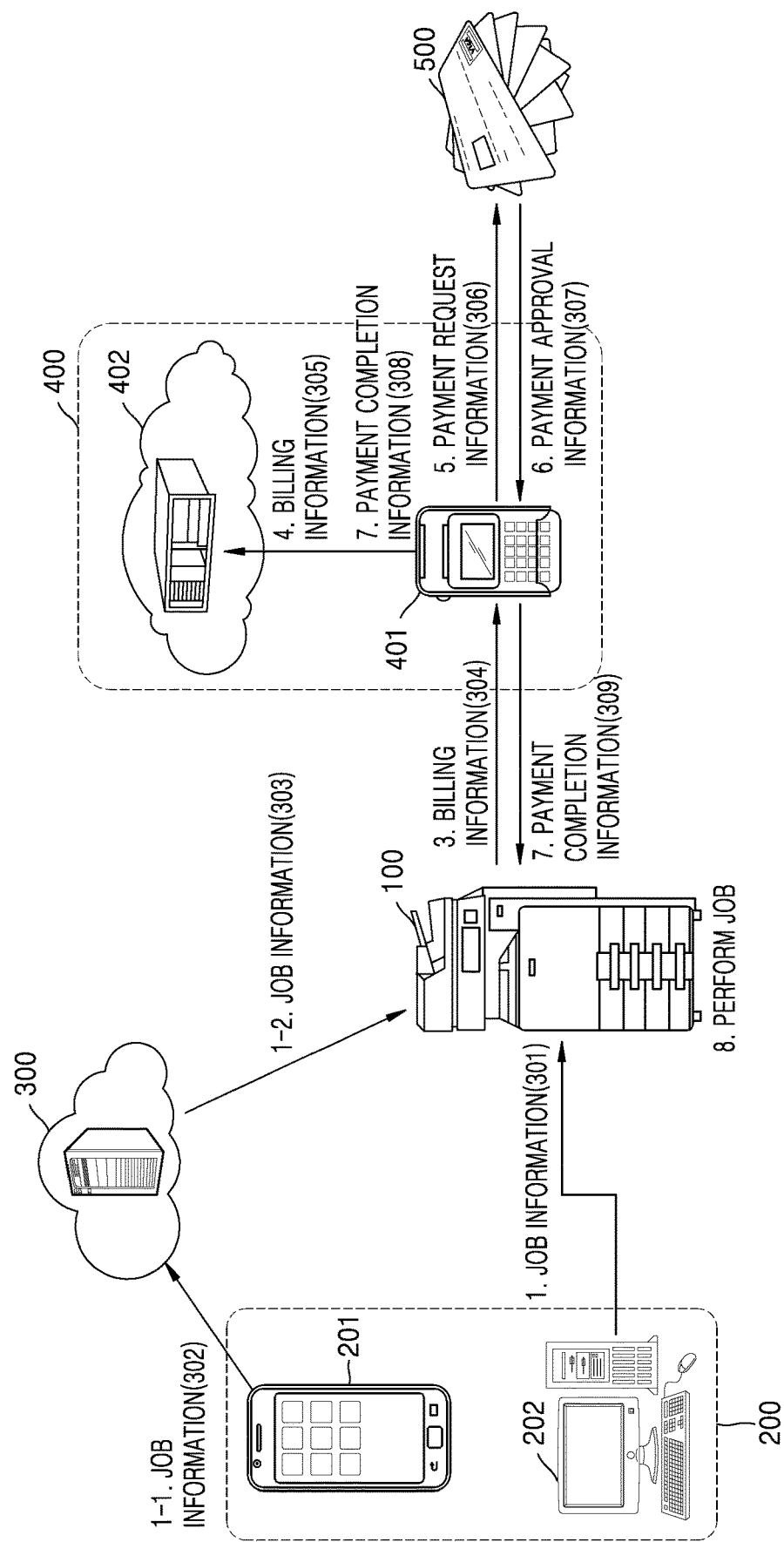
FIG. 3 is a block flow diagram for describing a job related to content according to an example.

FIG. 3 is a block flow diagram for describing a job related to content according to an example.

Referring to FIG. 3, a system may include the image forming apparatus 100, the external apparatus 200, the server 300 (for example, a cloud server), a payment system 400, and a payment agency 500. The payment system 400 may include a payment apparatus 401 for payment of job expenses using the image forming apparatus 100, and a payment server 402 for managing a job history of the image forming apparatus 100.

In this case, components of the system may be connected to each other through a communication network. For example, the image forming apparatus 100, the external apparatus 200, and the server 300 may be connected to each other via long distance wireless communication, and the image forming apparatus 100 and the payment apparatus 401 may be connected via short distance wireless communication or wired communication. The payment apparatus 401 may be attached to the image forming apparatus 100 or provided adjacent to the image forming apparatus 100.

According to an example, when a user requests content to be printed by using a PC 202, i.e., an example of the external apparatus 200, the PC 202 may transmit job information about a job related to the content to the image forming apparatus 100, in operation 301.

A job related to content may be a job related to printing, scanning, faxing, or copying of the content.

Also, job information may include at least one of a job type, a job ID, content, a job option, and the like. A job type may be information about whether a job of the image forming apparatus 100 is a printing job, a scanning job, a faxing job, or a copying job. A job option (for example, a print option) may include at least one of a size of printing paper, color printing, double-sided printing, the number of printouts, the number of pieces of scanned paper, and the number of copies. Content may be rendered in a format of print data.

As another example, when the user requests the content to be printed by using a smart phone 201, i.e., another example of the external apparatus 200, the smart phone 201 may transmit the job information to the server 300, in operation 302. In this case, the user may request the content to be printed by using a job application installed in the smart phone 201. The server 300 may render the content requested to be printed by the user to a format of print data, and transmit the rendered content and the job information to the image forming apparatus 100, in operation 303.

When the user requested the content to be printed, the external apparatus 200 may receive ID information (for example, a personal identity number (PIN), a password, etc.) from the user. Also, the external apparatus 200 may transmit the received ID information to the image forming apparatus 100. At this time, the external apparatus 200 may transmit the received ID information to the image forming apparatus 100 together with the job information, or inside the job information.

The ID information may be generated in units of job information about printing of the content, in units of content, or in units of the external apparatus 200. When the ID information is generated in units of the external apparatus 200, the ID information may be generated, for example, in units of a type of the external apparatus 200, ID information of the external apparatus 200, an internet protocol (IP) address used by the external apparatus 200, and the like.

When the ID information is generated in units of the job information, the ID information needs to be input whenever the user requests printing. Also, when the ID information is generated in units in relation to the external apparatus 200, the user does not need to additionally input the ID information when requesting printing using the external apparatus 200 once the user has input the ID information during an initial request for printing.

When the ID information (for example, a phone number assigned to a smart phone) pre-exists in the external apparatus 200, the external apparatus 200 may transmit the assigned ID information together with the job information to the image forming apparatus 100, without a separate input from the user. Alternatively, when the assigned ID information is transmitted to the server 300 together with the job information, the server 300 may transmit the received ID information to the image forming apparatus 100.

As described in the above examples, when the job information and the ID information are transmitted to the image forming apparatus 100, the image forming apparatus 100 may receive the job information and the ID information.

The user may move to the image forming apparatus 100 and input ID information through the I/O unit 110 of the image forming apparatus 100. The image forming apparatus 100 may determine whether the input ID information and the ID information received from the external apparatus 200 or server 300 correspond to each other. For example, the image forming apparatus 100 may determine whether the input ID information and the received ID information match each other. Alternatively, when the user pre-registered unique information in the image forming apparatus 100, the image forming apparatus 100 may determine whether the input ID information matches information in which the received ID information and the unique information are combined.

When it is determined that the input ID information and the received ID information correspond to each other, the image forming apparatus 100 may transmit billing information based on the job information to the payment system 400.

The billing information may include information about a payment method. For example, the billing information may include information about a payment device, a payment method, a payment application, a payment server, and the like.

The billing information may include payment method information and payment amount information corresponding to job expenses of the job information. The billing information may include information about a job, payment amount information, payment apparatus information, payment server information, and the like.

The billing information may include, for example, job expenses (for example, print expenses) and at least some of the job information. At least some of the job information may be at least one of, for example, job ID, a print option, a job type, and the like.

Job expenses may be determined based on a job option. For example, the job expenses may increase when the size of printing paper is large, color printing is set, the number of printouts is high, and the like. Alternatively, the job expenses may decrease when the size of printing paper is small or double-printing is set.

The payment system 400 may include at least one of the payment apparatus 401 and the payment server 402.

For example, the image forming apparatus 100 may transmit the billing information to the payment apparatus 401 (for example, a card terminal) of the payment system 400, in operation 304.

Upon receiving the billing information, the payment apparatus 401 may transmit the billing information to the payment server 402, in operation 305. In this case, the payment apparatus 401 may receive registration result information indicating that the billing information is registered, from the payment server 402 that received the billing information.

The payment apparatus 400 may display the job expenses included in the billing information for printing content. Upon checking the job expenses, the user may request payment by using the payment apparatus 401. For example, the user may request payment by using a credit card, a debit card, a transportation card, a Cashbee card, a rechargeable card (for example, a T-money card), a Payon method, or a Coin method. When the user requests payment, the payment apparatus 401 may transmit payment request information to the payment agency 500 (for example, a Value Added Network (VAN)), in operation 306. The payment request information may include, for example, at least one of a credit card number, a payment amount, transaction ID, ID information of the payment apparatus 401, and the like.

When payment is approved based on the received payment information, the payment agency 500 may transmit payment approval information to the payment apparatus 401 in operation 307. The payment approval information may include at least tone of, for example, an approval number, an approval result, and an approval date and time.

The payment apparatus 401 may transmit payment completion information according to the approval of payment to the payment server 402, in operation 308. The payment completion information may include at least one of job ID, transaction ID, job expenses, a credit card number, a payment result, and the like. At this time, the payment apparatus 401 may receive registration result information indicating that the payment completion information is registered from the payment server 402 that received the payment completion information.

Also, the payment apparatus 401 may transmit the payment completion information according to the approval of payment to the image forming apparatus 100, in operation 309.

Upon receiving the payment completion information, the image forming apparatus 100 may perform the job related to content based on the job information received in operations 301 and 303.

Also, the image forming apparatus 100 may transmit, to the payment server 402, job completion information according to completion of the job related to the content. The job completion information may include, for example, at least one of job ID, a job option, a job result, and the like. At this time, the image forming apparatus 100 may receive registration result information indicating that the job completion information is registered from the payment server 402 that received the job completion information.

The payment server 402 may manage a job history of the image forming apparatus 100 based on at least one of the billing information, the payment completion information, the job completion information, and the like.

For example, the content may not be printed even when the user has made payment. In this case, the user may access the payment server 402 (for example, access a service website or call an adviser) to request the content to be printed again. At this time, the payment server 402 may determine why the job related to content is not performed, based on the job history according to at least one of the billing information, the payment completion information, and the job completion information, and provide the user with feedback.

According to various examples, in the system of FIG. 3, there may be a plurality of the image forming apparatuses 100. In this case, the job information received by one of the plurality of image forming apparatuses 100 may be transmitted to another of the plurality of image forming apparatuses 100. For example, when a size of a job according to job information assigned to one image forming apparatus is equal to or greater than a threshold value, the image forming apparatus may redistribute the job to another image forming apparatus having a small-sized job. In this case, information about the image forming apparatus 100 that is to print the content requested by the user may be provided to the user. For example, ID information of the image forming apparatus 100 that is to print the content (for example, ID, a product name, or location information of the image forming apparatus 100) may be displayed through the external apparatus 200, displayed through the image forming apparatus 100 being manipulated by the user, or displayed through a separate guide display.

The user may conveniently receive a charged service for printing content by using a payment apparatus through the image forming apparatus 100.

The image forming apparatus 100 may self-generate payment information to proceed with payment without regard to a type of a payment method. Also, the image forming apparatus 100 may generate billing information for not only a job using a printing and copying function of the image forming apparatus 100, but also a job using a scanning and faxing function of the image forming apparatus 100.

Also, the image forming apparatus 100 may generate billing information in units of job information using the image forming apparatus 100 so as to prevent a job from being partially completed. Also, the image forming apparatus 100 may pre-calculate a payment amount according to job information of content and display the payment amount to the user such that the user may select a payment method based on the payment amount.

Figure 4:
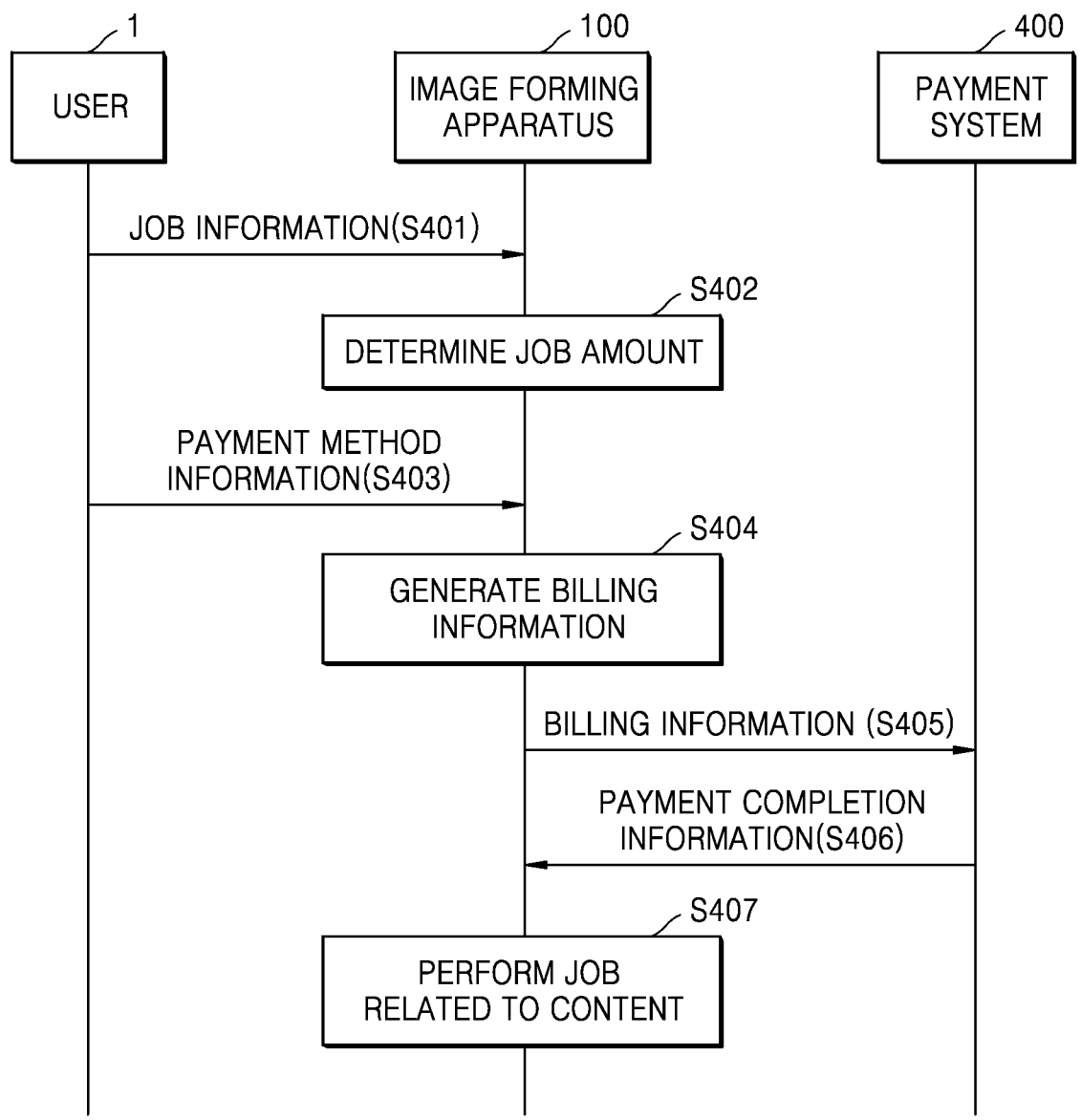
FIG. 4 is a flow diagram of a method of generating billing information including job information and payment method information according to an example.

FIG. 4 is a flow diagram of a method of generating billing information including job information and payment method information according to an example.

Referring to FIG. 4, a user 1 may transmit job information of content to the image forming apparatus 100 in operation S401. The job information may include information about which one of a printing job, a scanning job, a faxing job, a copying job, and the like is a job of the image forming apparatus 100. A job option (for example, a print option) may include at least one of a size of printing paper, color printing, double-sided printing, the number of printouts, the number of pieces of scanned paper, the number of copies, and the like. The content may be rendered to a format of print data.

In operation S402, the image forming apparatus 100 may determine a payment amount based on the job information. The image forming apparatus 100 may determine the payment amount based on amount information pre-determined according to job options.

In operation S403, the image forming apparatus 100 may receive payment method information from the user 1. The payment method information may denote a payment method used by the user 1 to pay the payment amount.

As an example, the image forming apparatus 100 may display a list of payment methods together with job expenses included in the billing information. Upon checking the job expenses, the user 1 may request payment by selecting a payment method. For example, the user 1 may request payment by using a credit card, a debit card, a transportation card, a Cashbee card, a rechargeable card (for example, a T-money card), a Payon method, or a Coin method.

In operation S404, the image forming apparatus 100 may generate billing information. The billing information may include the job information, information about the payment amount, and the payment method. The billing information may include an ID number set according to payment methods. Here, the ID number may include information about at least one of a communication protocol for communication, an IP address, a port, a uniform resource locator (URL), timeout information, an external payment device, and the like.

In operation S405, the image forming apparatus 100 may transmit the billing information to the payment system 400. The image forming apparatus 100 may select a payment method corresponding to the billing information from among the plurality of payment methods included in the payment system 400, and transmit the billing information.

In operation S406, the image forming apparatus 100 may receive payment completion information from the payment system 400.

In operation S407, upon receiving the payment completion information, the image forming apparatus 100 may perform a job related to content, based on the job information received in operation S401.

Figure 5:
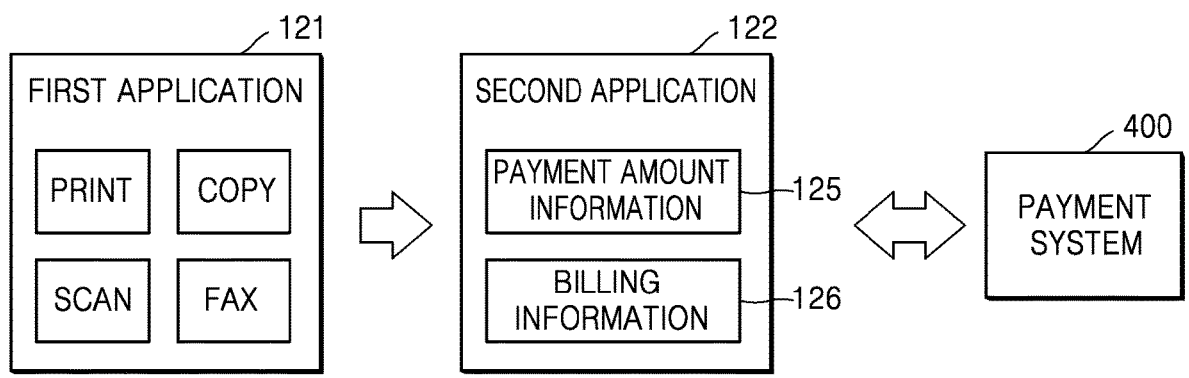
FIG. 5 is a diagram for describing an operation of an image forming apparatus including a first application and a second application according to an example.

FIG. 5 is a diagram for describing an operation of an image forming apparatus including a first application and a second application according to an example.

Referring to FIG. 5, the image forming apparatus 100 may generate billing information by using a first application 121 and a second application 122.

The image forming apparatus 100 may perform a job of the image forming apparatus 100 by using the first application 121. For example, the first application 121 may provide a function of performing a printing job, a copying job, a scanning job, or a faxing job.

The image forming apparatus 100 may generate information related by payment by using the second application 122. For example, the image forming apparatus 100 may generate payment amount information 125 and billing information 126 by using the second application 122.

The second application 122 may generate the payment amount information 125 by using job information of content received from the first application 121 that performs the job of the image forming apparatus 100. For example, when the job information includes information about "A4 size color printing 1 page," the payment amount information 125 of "200 won" may be generated based on pre-determined payment amount setting information.

The second application 122 may generate the billing information 126 based on the job information received from the first application 121 that performs the job of the image forming apparatus 100, pre-determined payment amount information, payment method information received from a user, and the like. For example, when the user inputs "credit card" as a payment method, the billing information 126 may be generated by matching the payment amount "200 won" with respect to the job information "A4 size color printing 1 page," to the payment method information of "credit card."

The image forming apparatus 100 may provide, to the payment system 400, the payment amount information 125 and the billing information 126 generated by using the second application 122 so as to perform unmanned payment without having to use a foreign device interface (FDI) device.

FIG. 6 is a diagram for describing communication information and ID information corresponding to a payment method according to an example.

Referring to FIG. 6, a plurality of payment methods may each include communication information and ID information.

The image forming apparatus 100 may communicate with a payment system via HTTP, socket, an Android application, and the like.

According to an example, a payment method may include cash, a credit card, an account transfer, a transportation card, a prepaid card, and the like. Also, the user may request payment by using a debit card, a Cashbee card, a rechargeable card (for example, a T-money card), a Payon method, or a Coin method. However, the payment method is not limited thereto.

The image forming apparatus 100 may prepare payment method information for generating information related to payment such that payment may be made by using a plurality of payment methods.

According to an example, the payment method information may include the communication information, such as a protocol, an IP address, a port, URL, timeout information, and the like. Also, the payment method information may include whether a card reader is required as a separate apparatus for using the payment method. Also, the payment method information may include an icon as an ID marker to be displayed to the user.

As shown in FIG. 6, each payment method may correspond to HTTP, socket, or an Android application. Also, the payment method may include a unique IP address and port number.

Also, the payment method may include a URL for using web communication. For example, a credit card may include URL information to proceed with payment through a web.

According to an example, the image forming apparatus 100 may generate billing information by using payment method information set according to payment methods.

FIG. 7 is a diagram for describing payment amount setting information according to an example.

Referring to FIG. 7, the image forming apparatus 100 may display a UI about the payment amount setting information through a display. The UI about the payment amount setting information may be displayed when a basic price menu 701 is elected from user setting menus.

According to an example, a user may set a currency unit 702 usable by the image forming apparatus 100. After the currency unit 702 is selected, an exchange rate corresponding to the selected currency unit 702 may be applied as payment information.

Also, the image forming apparatus 100 may assign a position 703 of a current sign. For example, when the position 703 is assigned to a suffix, a currency sign may be displayed in front of an amount, such as \2,000.

According to an example, the image forming apparatus 100 may assign the number of decimal places 704 required to charge the user an amount determined according to the exchange rate. For example, when a final amount is \2,120.32 and the number of decimal places is 0, \2,120 may be determined as a payment amount by rounding off the decimal amount to the nearest whole number.

Also, the image forming apparatus 100 may pre-set a price according to a job option 705. The job option (for example, a print option) 705 may include at least one of a size of printing paper, color printing, double-sided printing, the number of printouts, the number of pieces of scanned paper, and the number of copies. The user may set a price according to a job type, such as copying, scanning, printing, or faxing, and according to black-and-white printing or color printing.

Figure 8:
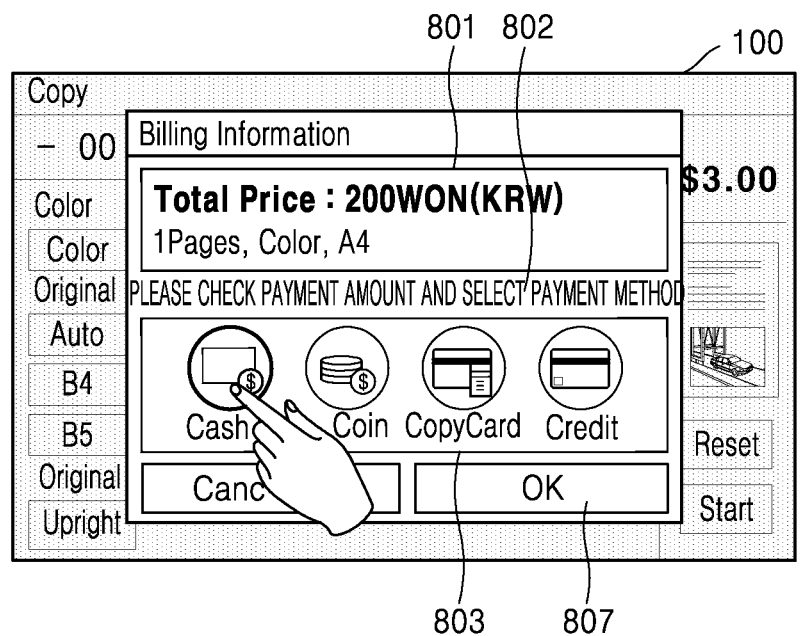
FIG. 8 is a diagram for describing a screen for requesting payment method information according to an example.

FIG. 8 is a diagram for describing a screen for requesting payment method information according to an example.

Referring to FIG. 8, the image forming apparatus 100 may display payment amount information 801 related to a job related to content. The image forming apparatus 100 may display the payment amount information 801 including information about job ID of content, a currency, an exchange rate, a price, a size of a job, color or black-and-white printing, a paper size, and the like.

According to an example, the image forming apparatus 100 may display a request 802 for a user input for a payment method. The image forming apparatus 100 may display a UI displaying icons of payment methods.

According to an example, the image forming apparatus 100 may display a UI 803 for selecting one of a plurality of payment methods. The image forming apparatus 100 may display a list of pre-determined icons according to the plurality of payment methods.

According to an example, the image forming apparatus 100 may provide a list of payment methods available to a user. The image forming apparatus 100 may provide the list of payment methods while considering an operation condition of a current payment apparatus, available amount of a pre-paid card, etc.

According to an example, the image forming apparatus 100 may change and display an attribute of a payment method currently available to the user from among all payment methods available in the image forming apparatus 100. For example, an icon of a payment method available to the user may be displayed in color while other icons unavailable to the user are displayed in black-and-white.

The image forming apparatus 100 may receive a selection of one payment method from the user. The image forming apparatus 100 may change and display an attribute of the selected payment method. For example, when cash is selected as a payment method, a color, a shape, or a size of an icon corresponding to cash may be changed and displayed. Alternatively, the image forming apparatus 100 may change and display attributes of icons corresponding to payment methods other than the selected payment method.

When the user selects an OK button 807 after selecting one of the plurality of payment methods, the image forming apparatus 100 may generate billing information including payment amount information and payment method information.

Figure 9:
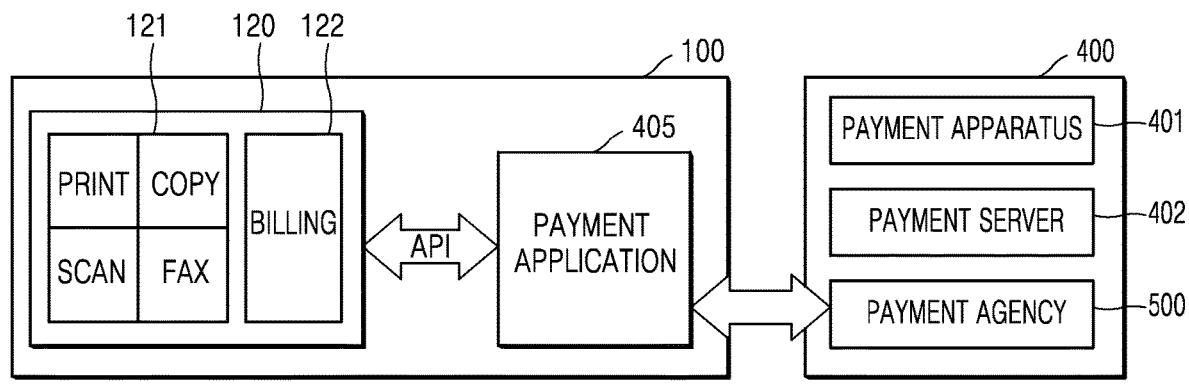
FIG. 9 is a diagram for describing a process of performing payment when a payment application is in an image forming apparatus according to an example.

FIG. 9 is a diagram for describing a process of performing payment when a payment application is in an image forming apparatus according to an example.

Referring to FIG. 9, the controller 120 may generate payment amount information and billing information by using the first application 121 and the second application 122.

According to an example, the second application 122 may generate the billing information by using job information of content received from the first application 121 that performs a job of the image forming apparatus 100.

The first application 121 may provide a function of the image forming apparatus 100, such as printing, copying, scanning, or faxing. The controller 120 may analyze the job information of the content by using the first application 121.

The second application 122 may generate information related to billing with respect to the job related to the content. The controller 120 may receive the job information of the content from the first application 121, and generate the payment amount information based on the job information of the content by using the second application 122. Also, the controller 120 may generate the billing information based on the job information of the content received from the first application 121 and payment method information received from a user.

The image forming apparatus 100 may include a payment application 405. The payment application 405 included in the image forming apparatus 100 may be in a format of Android or XOA.

The controller 120 may generate and transmit the payment amount information or the billing information to the payment application 405. The payment application 405 may perform payment when possible, such as when a payment method is performed through the payment application 405. Alternatively, the payment application 405 may transmit the billing information to the payment system 400.

The payment system 400 may include at least one of the payment apparatus 401, the payment server 402, and the payment agency 500. The payment apparatus 401 may transmit the billing information to the payment server 402. Alternatively, the image forming apparatus 100 may directly transmit the billing information to the payment server 402.

When the payment apparatus 401 displays printing expenses included in the billing information, the user may check the printing expenses and request payment by using a credit card or the like. When the payment is requested, the payment apparatus 401 may transmit payment request information to the payment agency 500.

The payment agency 500 may transmit payment approval information to the payment apparatus 401 when the payment is approved based on the received payment request information. Upon receiving the payment approval information, the payment apparatus 401 may process the payment and transmit payment completion information to the image forming apparatus 100 and the payment server 402.

According to an example, upon receiving the payment completion information, the image forming apparatus 100 may print the content based on the received job information. When printing of the content is completed, the image forming apparatus 100 may transmit content print completion information according to completion of the printing of the content to the payment server 402.

Figure 10:
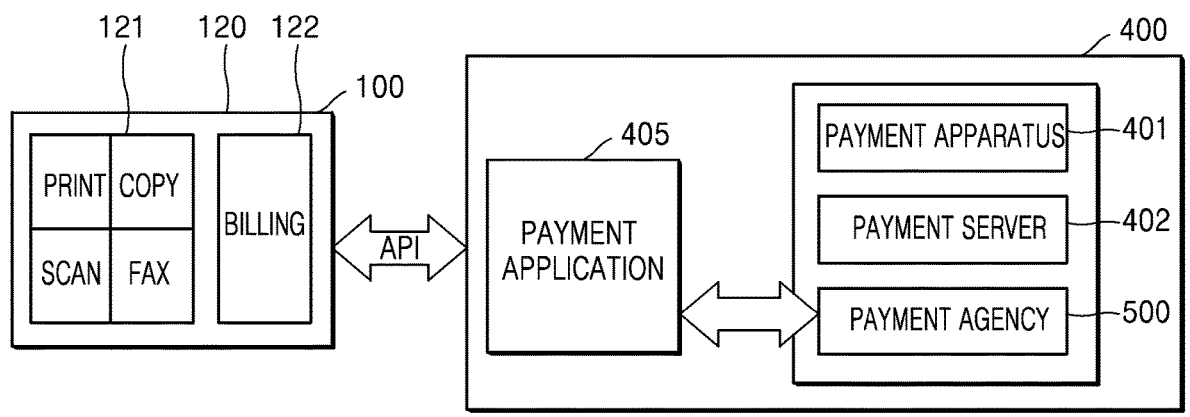
FIG. 10 is a diagram for describing a process of performing payment when a payment application is outside an image forming apparatus according to an example.

FIG. 10 is a diagram for describing a process of performing payment when a payment application is outside an image forming apparatus according to an example.

Referring to FIG. 10, the image forming apparatus 100 may not include the payment application 405. The image forming apparatus 100 may transmit payment amount information and billing information to the payment application 405 located outside the payment system 400.

The image forming apparatus 100 may provide an application program interface (API) service to provide an effect of inter connecting various payment methods. According to an example, since various payment apparatuses may obtain information required for billing through the API service from the image forming apparatus 100, a payment service may be provided regardless of a type of a payment apparatus.

Also, the image forming apparatus 100 may provide a payment service regardless of a type of a job related to content since billing information including job information of the content is received by using the API service.

FIG. 11 is a flow diagram of a system for performing a job related to content according to an example.

Referring to FIG. 11, the image forming apparatus 100 may perform preliminary payment and main payment in response to a job request of content. In the preliminary payment, a state of a payment device available to a user, a balance when a pre-paid card is used, a payment method available in the image forming apparatus 100, and the like may be determined by using payment amount information corresponding to the job request of content. According to an example, in the main payment, actual billing may be performed as the user checks a payment amount and inputs a payment method.

In operation S1101, the image forming apparatus 100 may request a job related to content. For example, the job may include at least one of a copying job, a scanning job, a printing job, and a faxing job related to the content.

In operation S1102, the image forming apparatus 100 may generate payment information. According to an example, the image forming apparatus 100 may generate payment amount information about the job related to the content, based on price information pre-set according to jobs.

In operation S1103, the image forming apparatus 100 may transmit the payment information to the payment apparatus 401.

In operation S1104, the payment apparatus 401 may request the payment server 402 for preliminary payment.

In operation S1105, the payment server 402 may transmit preliminary payment completion information to the image forming apparatus 100. The preliminary payment completion information may include information about a state of a payment device, a discount rate according to a payment method, a limitation of a payment plan, and the like. The image forming apparatus 100 may determine a payment error that may be generated before payment through the preliminary payment completion information.

In operation S1106, the image forming apparatus 100 may transmit payment request information to the user 1. The payment request information may include payment amount information, information about an available payment method, discount information per payment method, information about a payment method, and the like.

In operation S1107, the image forming apparatus 100 may receive payment method and payment approval information from the user 1.

In operation S1108, the image forming apparatus 100 may generate billing information. The image forming apparatus 100 may generate billing information including the payment method information and the payment amount information with respect to the job related to the content.

In operation S1109, the image forming apparatus 100 may transmit the billing information to the payment apparatus 401. The billing information may include all of information about the job related to the content, the payment amount information, the payment method information, and the like. The payment method information included in the billing information may include information for transmitting the payment amount information to a payment method selected by the user.

In operation S1110, the payment apparatus 401 may request the payment server 402 for main payment.

In operation S1111, the payment server 402 may transmit payment completion information to the payment apparatus 401 according to payment completion of the user 1.

In operation S1112, the payment apparatus 401 may transmit the payment completion information to the image forming apparatus 100.

In operation S1113, upon receiving the payment completion information from the payment apparatus 401, the image forming apparatus 100 may perform the job related to the content.

FIGS. 12A through 12D illustrate UIs for a job related to content according to an example.

Figure 12A:
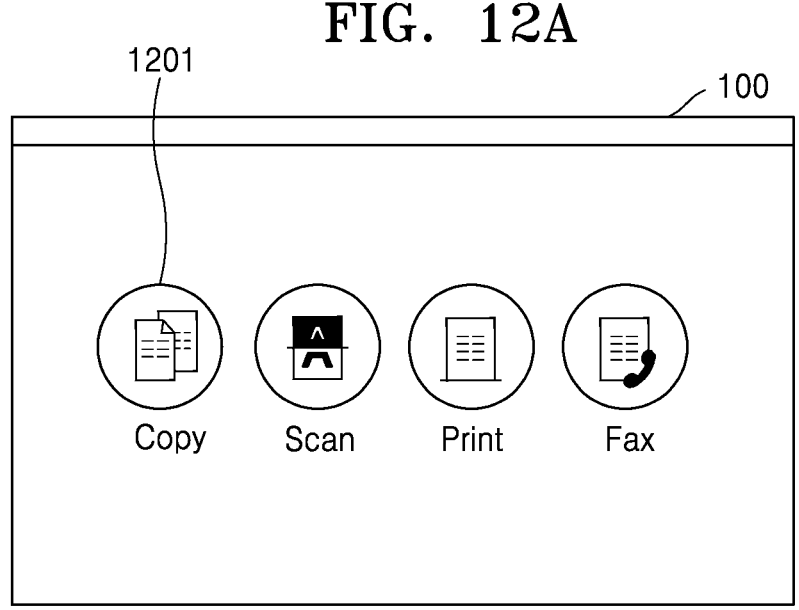
FIGS. 12A through 12D illustrate user interfaces for a job related to content according to an example.

Referring to FIG. 12A, the image forming apparatus 100 may provide a main screen that may receive a user input of selecting a copying job UI element 1201.

Figure 12B:
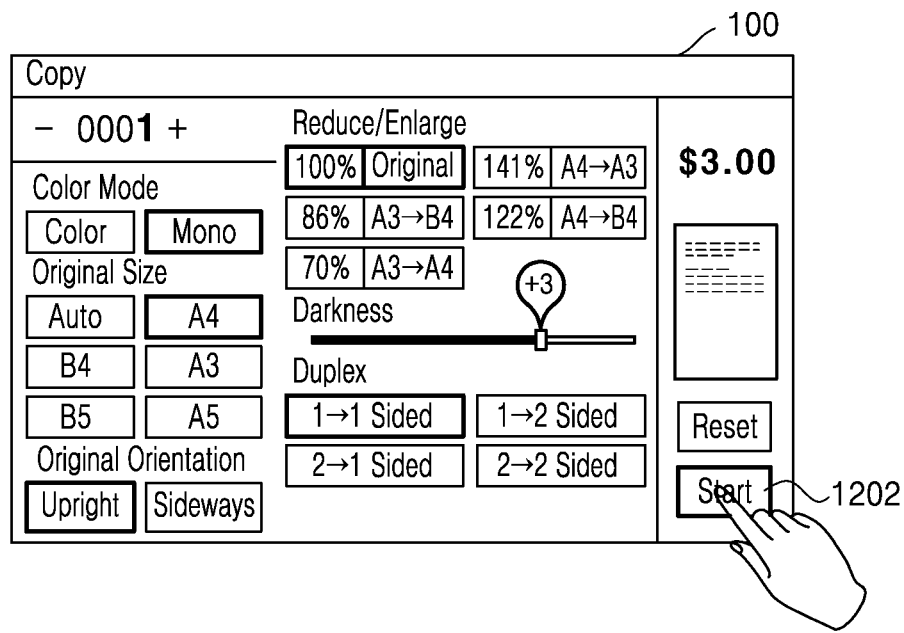

Referring to FIG. 12B, the image forming apparatus 100 may provide a screen of selecting a copying option according to the user input of selecting the copying job UI element 1201.

Figure 12C:
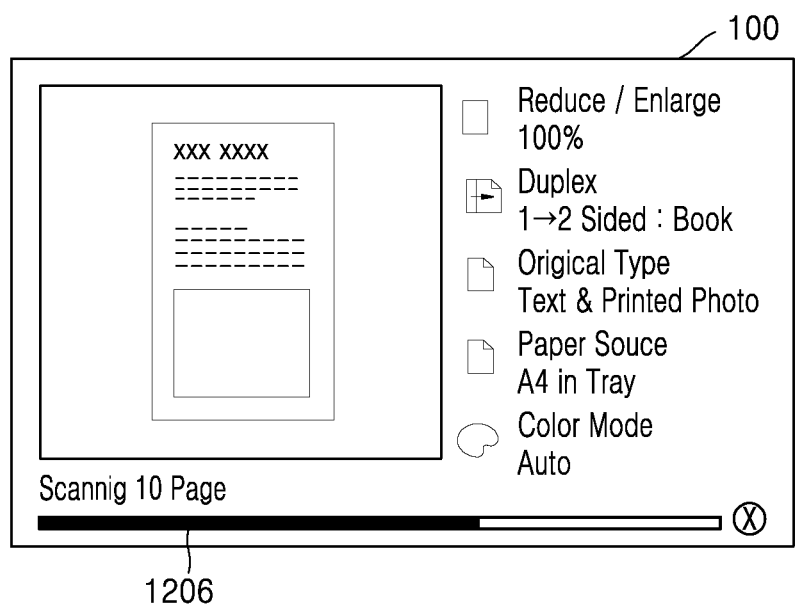

After the copying option is determined, the image forming apparatus 100 may scan an image of paper loaded in the image forming apparatus 100 and provide visual feedback 1206 indicating scanning as shown in FIG. 12C according to a user input of selecting a copying start UI element 1202.

Figure 12D:
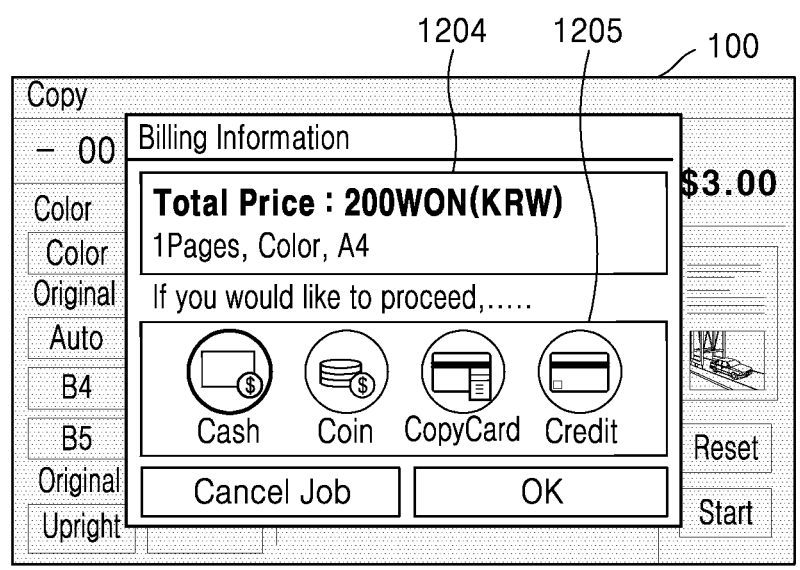

After the scanning is completed, the image forming apparatus 100 may provide a guide message requesting a user for payment, as shown in FIG. 12D. The guide message may include, for example, information indicating that the scanned image will be printed after the payment is made.

The guide message may include a message 1204 indicating information about a payment amount and a message 1205 for selecting a payment method.

When the user performs payment by using the payment apparatus 401 according to the guide message and the image forming apparatus 100 receives payment completion information from the payment system 400, the image forming apparatus 100 may print the scanned image according to the copying option set in FIG. 12B.

Figure 13A:
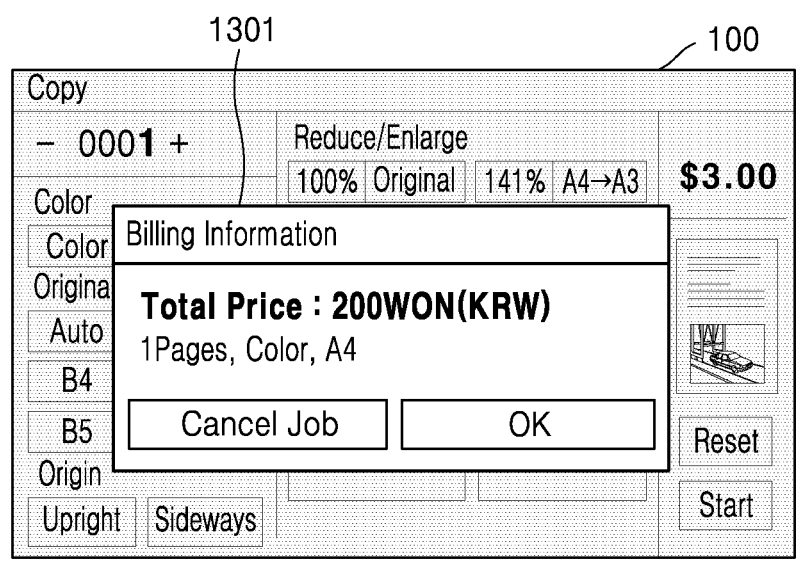
FIGS. 13A through 13C illustrate user interfaces when payment is made by using an external payment device according to an example.
Figure 13B:
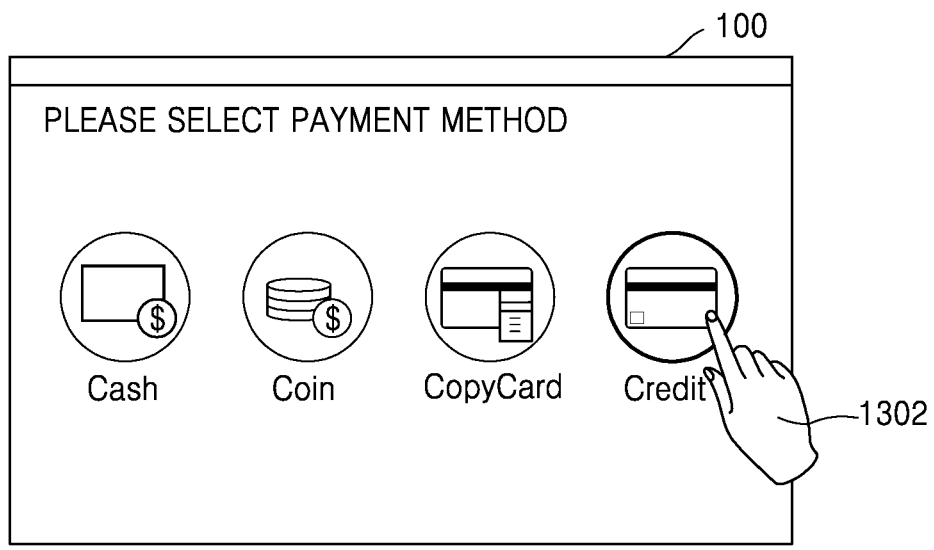
Figure 13C:
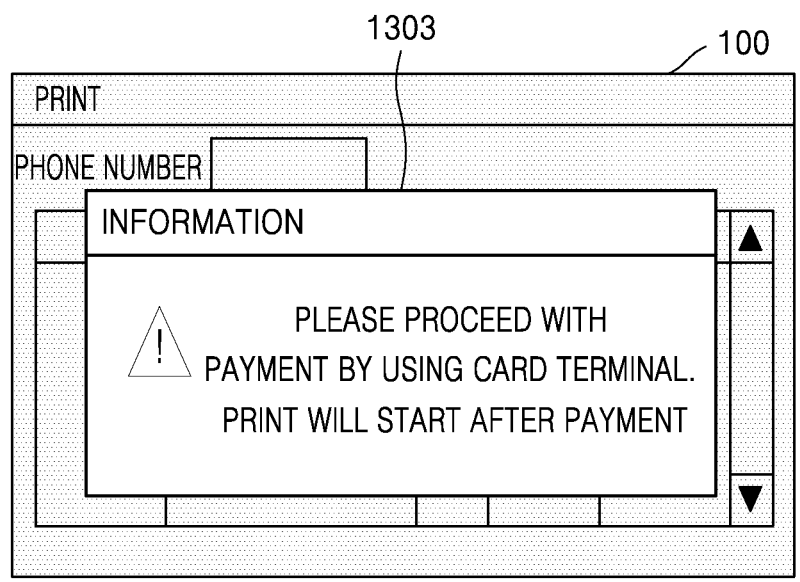

FIGS. 13A through 13C illustrate UIs when payment is made by using an external payment device according to an example.

Referring to FIG. 13A, the image forming apparatus 100 may display a message 1301 indicating payment amount information determined according to a copying option.

Referring to FIG. 13B, the image forming apparatus 100 may provide a guide message requesting a user to select a payment method. The guide message may include, for example, information indicating that a scanned image is printable only after payment is made.

The image forming apparatus 100 may display icons of a plurality of payment methods. The image forming apparatus 100 may print the scanned image according to the copying option upon receiving payment completion information from the payment system 400 when the user makes the payment by using the payment apparatus 401 according to a request of a guide screen 1303 shown in FIG. 13C, as the user selects a credit card UI element 1302.

Figure 14:
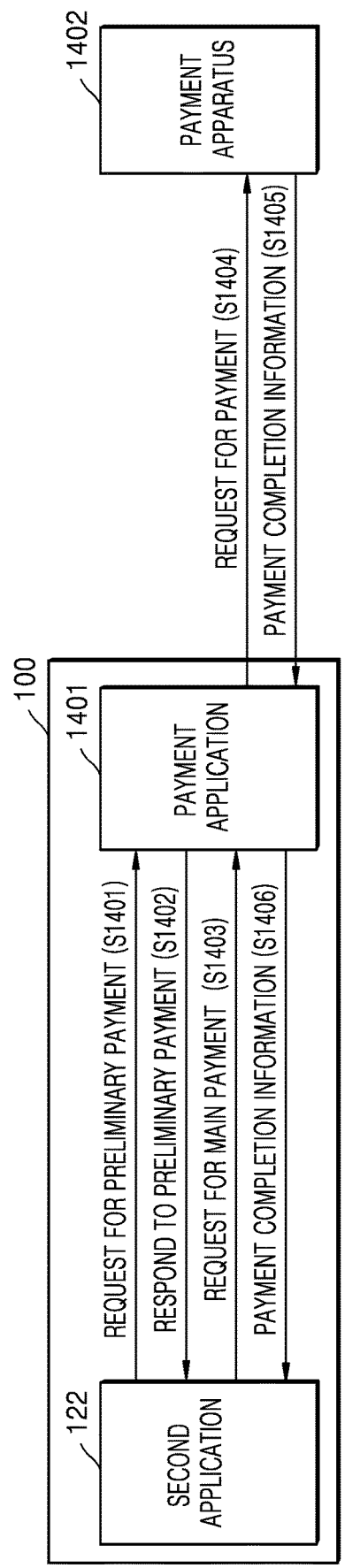
FIG. 14 is a block flow diagram for describing an image forming apparatus communicating with a payment apparatus by using a payment application existing in the image forming apparatus according to an example.

FIG. 14 is a block flow diagram for describing an image forming apparatus communicating with a payment apparatus by using a payment application existing in the image forming apparatus according to an example.

Referring to FIG. 14, the image forming apparatus 100 may self-include a payment application 1401. Payment may be performed through the payment application 1401 included in the image forming apparatus 100.

The second application 122 and the payment application 1401 may communicate via an HTTP, socket, or Android method.

According to an example, data communicating via an HTTP or HTTPs method is as follows. HTTP is a communication protocol for transmitting a document between a web server used on the Internet and an Internet browser of a user. HTTPs is a protocol in which security of HTTP is reinforced.

Table 1 shows data information about general data communication using HTTP or HTTPs.

TABLE 1

| Type | Name | Description | Example |
|---|---|---|---|
| Request | cmd | Command | prePay, pay, jobLog, . . . |
| | serial | MFP serial Number | 29EUB1EF900001N |
| | Mac | MFP MAC Address | 30:cd:a7:5f:b2:df |
| | jobType | Job type | Copy, Print, Scan, Fax |
| | jobId | Job ID | 20161108075412 |
| | language | Current language of MFP | en, ko, pt, it, fr, . . . |
| | ext_* | 3$^{rd}$ party properties (optional) | |
| Response | success | Process result | true, false |
| | msg | Process result message | "No balance." . . . |

Table 2 shows communication data information for requesting preliminary payment using HTTP or HTTPs.

TABLE 2

| Type | Name | Description | Example |
|---|---|---|---|
| Request | paperSize | Paper size value | A4, B4, Letter, Legal, .... |
| | color | Color value (Boolean) | true, false |
| | duplex | Duplex value (Boolean) | true, false |
| | nUp | N-up value | 1, 2, 4 |
| | copies | Copies value | 1, 2, 3, . . . |
| | scanCount | Scan page count value | 1, 2, 3, . . . |
| | totalPages | Total page value to be output | 1, 2, 3, . . . |
| | totalAmount | Total amount (float) | |
| Response | totalAmount | Total amount (float) | |

Table 3 shows communication data information for requesting main payment using HTTP or HTTPs.

TABLE 3

| Type | Name | Description | Example |
|---|---|---|---|
| Request | paperSize | Paper size value | A4, B4, Letter, Legal, . . . . |
| | color | Color value (Boolean) | true, false |
| | duplex | Duplex value (Boolean) | true, false |
| | nUp | N-up value | 1, 2, 4 |
| | copies | Copies value | 1, 2, 3, . . . |
| | scanCount | Scan page count value | 1, 2, 3, . . . |
| | totalPages | Total page value to be output | 1, 2, 3, . . . |
| | cardNumber | Card number (USB card reader) | |
| | totalAmount | Total amount (float) | |
| Response | totalAmount | Total amount (float) | |

Table 4 shows communication data information for requesting a job log using HTTP or HTTPs.

TABLE 4

| Type | Name | Description | Example |
|---|---|---|---|
| Request | success | Result of printed job | true, false |
| | totalpages | Total printed page count | true, false |

Table 5 shows communication data information uploading an image using HTTP or HTTPs.

TABLE 5

| Type | Name | Description | Example |
|---|---|---|---|
| Request | file | Scan or fax image file | |

Table 6 shows communication data information for requesting price setting information according to a job request using HTTP or HTTPs.

TABLE 6

| Type | Name | Description | Example |
|---|---|---|---|
| Response (Array) | jobType | Job type | Copy, Print, Scan, Fax |
| | paperSize | Paper size value | A4, B4, Letter, Legal, . . . |
| | color | Color value (Boolean) | true, false |
| | price | Price value (float) | |

In operation S1401, the image forming apparatus 100 may request preliminary payment by transmitting payment amount information generated by using the second application 122 to the payment application 1401.

In operation S1402, the payment application 1401 may transmit information about an available payment method, discount rate, and necessity of a payment device to the image forming apparatus 100 in response to the request for preliminary payment.

In operation S1403, the image forming apparatus 100 may request main payment by transmitting billing information generated by using the second application 122 to the payment application 1401.

In operation S1404, the image forming apparatus 100 may request the payment apparatus 1402 for payment through the payment application 1401. The payment apparatus 1402 is a payment method included in the billing information and selected by a user.

In operation S1405, the payment apparatus 1402 may transmit payment completion information to the payment application 1401 of the image forming apparatus 100.

In operation S1406, the image forming apparatus 100 may transmit the payment completion information received through the payment application 1401 to the second application 122.

Figure 15:
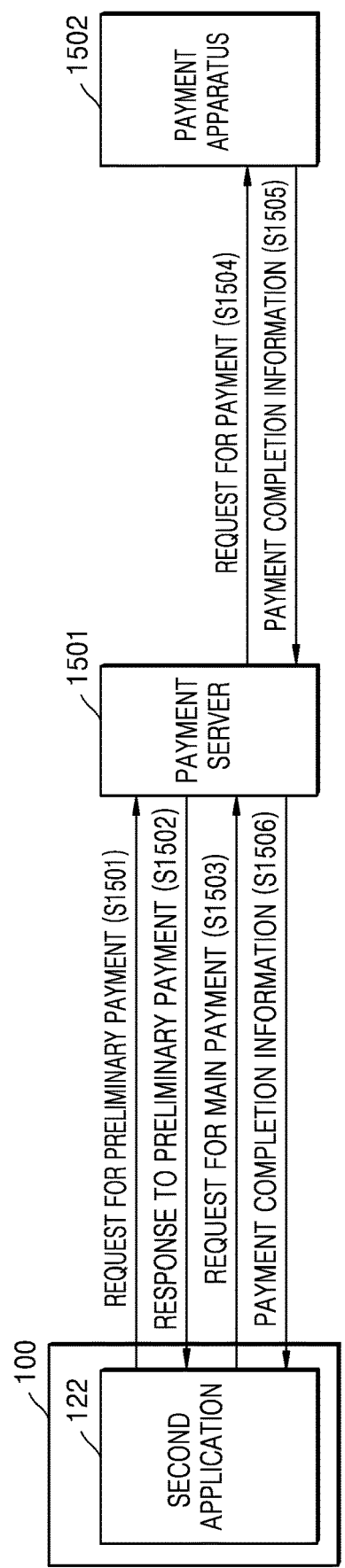
FIG. 15 is a block flow diagram for describing an image forming apparatus communicating with a payment apparatus by using a payment server according to an example.

FIG. 15 is a block flow diagram for describing an image forming apparatus communicating with a payment apparatus by using a payment server according to an example.

Referring to FIG. 15, the image forming apparatus 100 may perform payment with a payment server 1501 and a payment apparatus 1502 located outside the image forming apparatus 100, by using the second application 122.

The second application 122 and the payment server 1501 may communicate via HTTP or a socket. The socket is an Internet protocol of transmitting data by using a proxy server in an Internet client/server environment. For example, the socket is a protocol that realizes a firewall function when a client of a network in a company accesses an Internet web server outside the company.

Request and response data using the socket requires a 20-byte header field, and a length of data needs to be the same as a length defined in a header. A basic communication method is the same as that described with reference to HTTP, and a data structure is as Table 7 below.

TABLE 7

| Name | Length (Bytes) | Description |
| --- | --- | --- |
| Data Header | 8 | Total bytes of data |
| Image Header | 12 | Total bytes of image |
| Data | Variable | JSON data |
| Image | Variable | Image data |

In operation S1501, the image forming apparatus 100 may request preliminary payment by transmitting payment amount information generated by using the second application 122 to the payment server 1501.

In operation S1502, the payment server 1501 may transmit, to the image forming apparatus 100, information about an available payment method, a discount rate, and necessity of a payment device, in response to the preliminary payment.

In operation S1503, the image forming apparatus 100 may request main payment by transmitting billing information generated by using the second application 122 to the payment server 1501.

In operation S1504, the image forming apparatus 100 may request the payment apparatus 1502 for payment through the payment server 1501. The payment apparatus 1502 is a payment method included in the billing information and selected by a user.

In operation S1505, the payment apparatus 1502 may transmit payment completion information to the payment server 1501, and in operation S1506, the payment server 1501 may transmit the payment completion information to the image forming apparatus 100.

Figure 16:
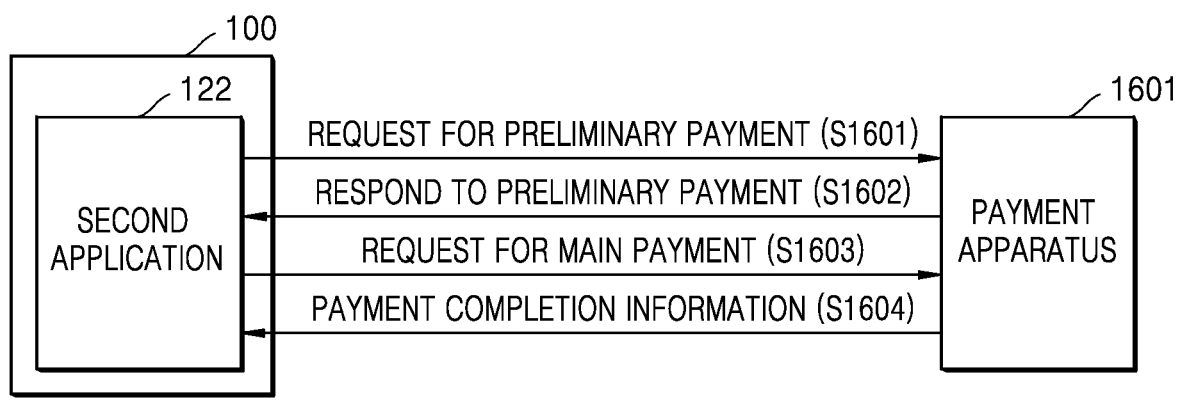
FIG. 16 is a block flow diagram for describing an image forming apparatus directly communicating with a payment apparatus according to an example.

FIG. 16 is a block flow diagram for describing an image forming apparatus directly communicating with a payment apparatus according to an example.

Referring to FIG. 16, the image forming apparatus 100 may perform direct payment with a payment apparatus 1601 located outside the image forming apparatus 100, by using the second application 122.

In operation S1601, the image forming apparatus 100 may request preliminary payment by transmitting payment amount information generated by using the second application 122 to the payment apparatus 1601.

In operation S1602, the payment apparatus 1601 may transmit, to the image forming apparatus 100, information about an available payment method, a discount rate, and necessity of a payment device, in response to the preliminary payment.

In operation S1603, the image forming apparatus 100 may request main payment by transmitting billing information generated by using the second application 122 to the payment apparatus 1601.

In operation S1604, the payment apparatus 1601 may transmit payment completion information to the image forming apparatus 100.

The second application 122 and the payment apparatus 1601 may communicate via HTTP, a socket, or Android. The payment apparatus 1601 may be a cash machine, a rechargeable magnetic device, or the like.

According to an example, the image forming apparatus 100 and the payment apparatus 1601 may perform payment without using a payment application or a payment server. In other words, the image forming apparatus 100 may generate information required for communication for payment such that the payment may be performed via an external payment apparatus.

Figure 17:
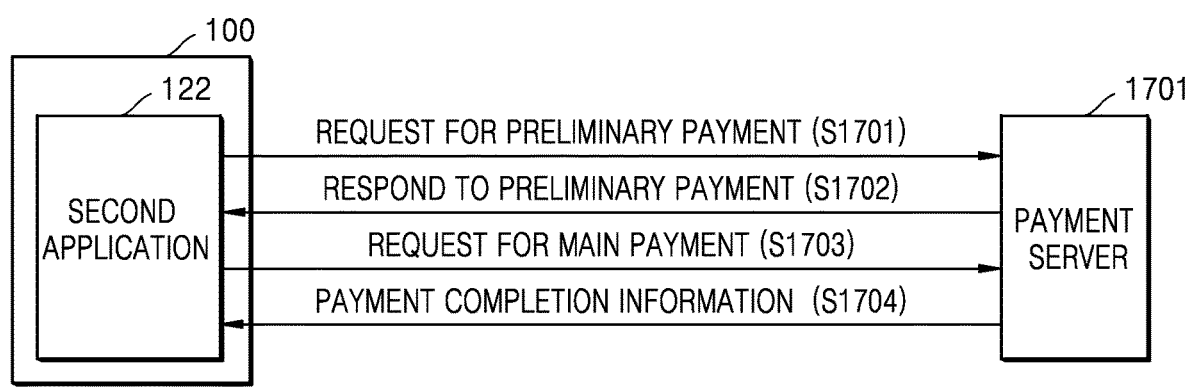
FIG. 17 is a block flow diagram for describing an image forming apparatus directly communicating with a payment server according to an example.

FIG. 17 is a block flow diagram for describing an image forming apparatus directly communicating with a payment server according to an example.

Referring to FIG. 17, the image forming apparatus 100 may perform direct payment with a payment server 1701 located outside the image forming apparatus 100, by using the second application 122.

The second application 122 and the payment server 1701 may communicate via HTTP or a socket. The payment server 1701 may include a pre-paid card or a membership card.

When a payment method selected by a user is a pre-paid card according to an example, the payment server 1701 may determine whether payment is performable by using the pre-paid card by comparing a balance of the pre-paid card and a payment amount of a job while preliminary payment is requested in operation S1701.

In operation S1702, the payment server 1701 may transmit a response with respect to the request for the preliminary payment, to the second application 122. For example, the payment server 1701 may respond that payment is not possible to be performed due to an insufficient balance of the pre-paid card. In this case, the image forming apparatus 100 may display a message that payment is not performable by using the pre-paid card.

In operation S1703, the image forming apparatus 100 may request main payment by transmitting billing information generated by using the second application 122 to the payment server 1701.

In operation S1704, the payment server 1701 may transmit payment completion information to the image forming apparatus 100.

Figure 18:
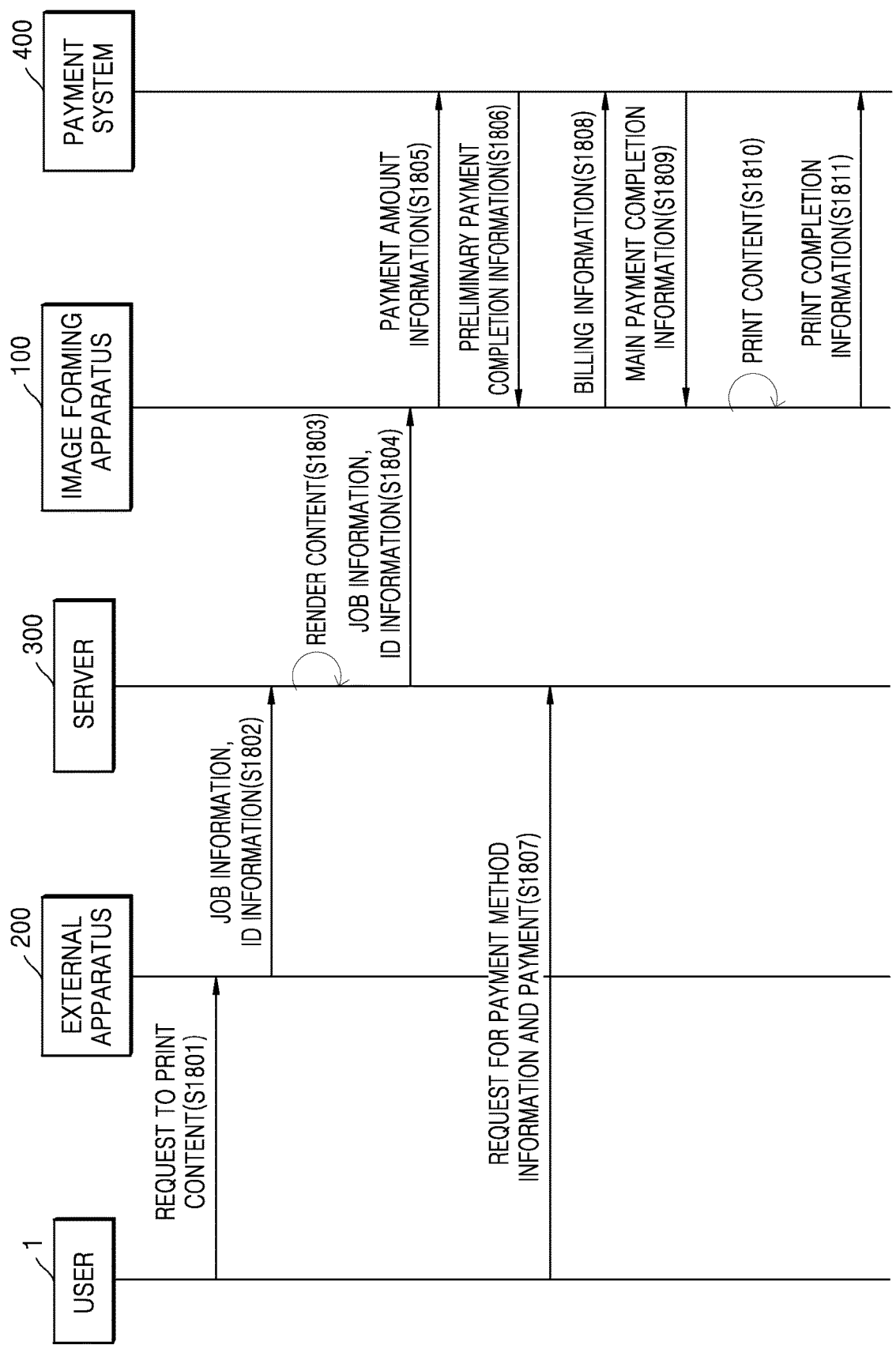
FIG. 18 is a flow diagram of a system for printing content by using an external apparatus and a cloud server according to an example.

FIG. 18 is a flow diagram of a system for printing content by using an external apparatus and a server according to an example. In an example, the server 300 may be a cloud server.

Referring to FIG. 18, the user 1 may request the external apparatus 200 (for example, a smart phone) to print content in operation S1801.

In operation S1802, the external apparatus 200 may transmit job information required to print the content and ID information of the external apparatus 200 to the server 300. Here, the ID information of the external apparatus 200 may be a phone number assigned to the external apparatus 200.

In operation S1803, the server 300 may render the content included in the job information to a format of print data.

In operation S1804, the server 300 may transmit the ID information and the job information including the rendered content to the image forming apparatus 100.

As another example, when the content is pre-stored in the server 300, the external apparatus 200 may transmit ID information of the content and the ID information of the external apparatus 200 to the server 300. In this case, the server 300 may transmit the ID information of the external apparatus 200 and the job information including the content in a format of print data, which corresponds to the ID information of the content, to the image forming apparatus 100.

In operation S1805, the image forming apparatus 100 may transmit payment amount information generated based on the job information to the payment system 400.

In operation S1806, the payment system 400 may transmit preliminary payment completion information to the image forming apparatus 100. In this regard, the image forming apparatus 100 may request the user 1 for payment method information.

In operation S1807, the user 1 may request the image forming apparatus 100 for the payment method information and payment.

In operation S1808, the image forming apparatus 100 may transmit billing information generated by using the payment method information and payment amount information.

In operation S1809, the payment system 400 may transmit main payment completion information.

In operation S1810, the image forming apparatus 100 may print the content based on the job information. Also, in operation S1811, the image forming apparatus 100 may transmit print completion information to the payment system 400.

FIG. 19 is a flow diagram of a system for copying content according to an example.

Referring to FIG. 19, the user 1 may request the image forming apparatus 100 to copy an image, such as an image recorded on paper, in operation S1901. In response to the request of the user 1, the image forming apparatus 100 may irradiate light to scan the image and determine a payment amount related to the scanned image, in operation S1902.

The image forming apparatus 100 may receive payment method information from the user 1 in operation S1903, and generate billing information in operation S1904 based on the payment method information and job information for printing the scanned image.

The image forming apparatus 100 may transmit the billing information to the payment system 400 in operation S1905. In response to a request by the user 1 for payment in operation S1906 to the payment system 400, the image forming apparatus 100 may transmit payment approval information to the payment system 400 in operation S1907. Also, the image forming apparatus 100 may receive payment completion information according to completion of payment, in operation S1908. Upon receiving the payment completion information, the image forming apparatus 100 may print the image scanned in operation S1902 on a print medium in operation S1909.

FIG. 20 is a flow diagram of a system for scanning content according to an example.

Referring to FIG. 20, the user 1 may request the image forming apparatus 100 to scan an image recorded on paper, in operation S2001. In response to the request of the user 1, the image forming apparatus 100 may irradiate light onto paper to scan the image recorded on the paper, and determine a payment amount related to the scanned image, in operation S2002.

The image forming apparatus 100 may receive payment method information from the user 1 in operation S2003, and determine billing information based on job information for printing the scanned image in operation S2004. The image forming apparatus 100 may transmit the billing information to the payment system 400 in operation S2005. The image forming apparatus 100 may receive payment completion information according to completion of payment of the user 1 in operation S2006.

Upon receiving the payment completion information, the image forming apparatus 100 may transmit a file obtained by scanning the image to a destination in operation S2007. Here, the destination may be, for example, a mobile disk included in the image forming apparatus 100, a cloud server, an email server corresponding to an email address separately input by the user 1, or a device of a third person. Alternatively, the destination may be a user terminal communicating with the image forming apparatus 100 via short-range communication.

The image forming apparatus 100 may transmit scan completion information according to generation and transmission of the file to the payment system 400, in operation S2008.

In an example, when the user 1 scans the image recorded on the paper, the user 1 may input a password required to execute the file through the image forming apparatus 100. In this case, the password is transmitted to the destination together with the file, and when the user 1 or a third person requests to execute the file, the file may be executed after the password is authenticated.

The examples described above may be embodied as computer-readable codes on a non-transitory computer-readable recording medium storing commands and data executable by a computer. At least one of the commands and the data may be stored in a form of a program code, and may perform an operation by generating a program module when executed by a processor.

Examples of the non-transitory computer-readable recording medium include magnetic storage media (e.g., ROM, floppy disks, hard disks, etc.), optical recording media (e.g., CD-ROMs, or DVDs), memories included in a server accessible through a network, etc. For example, the non-transitory computer-readable recording medium may be at least one of the memory 140 of the image forming apparatus 100 or a memory of the I/O unit 110 that is configured as an independent control system. Alternatively, the non-transitory computer-readable recording medium may be the memory 240 included in the external apparatus 200 connected to the image forming apparatus 100 through a network.

The invention claimed is:

1. A printing method, performed by an image forming apparatus, the printing method comprising:
   receiving job information of content;
   generating payment amount information based on the job information of the content;
   transmitting the payment amount information to a payment system;
   receiving, from the payment system, preliminary payment information including available payment methods;
   receiving payment method information selected from the available payment methods from a user;
   generating billing information by using the payment amount information and the payment method information;
   transmitting the billing information to the payment system; and
   upon receiving, from the payment system, payment completion information according to payment by the user, executing a job with respect to the content based on the job information of the content.

2. The printing method of claim 1, wherein the generating of the payment amount information comprises:
   generating, by using a second application, the payment amount information by using the job information of the content received from a first application performing a job of the image forming apparatus.

3. The printing method of claim 1, wherein the generating of the payment amount information comprises:
   determining a payment amount based on payment amount setting information corresponding to the job information of the content;
   determining at least one payment apparatus usable by the user; and generating the payment amount information based on the payment amount and the at least one payment apparatus.

4. The printing method of claim 3, wherein the preliminary payment information comprising further comprises at least one of an error condition of a payment device, or prepayment usability.

5. The printing method of claim 1, wherein the generating of the billing information comprises:
determining communication information corresponding to the payment method information; and
generating the billing information by using the communication information and the payment amount information.

6. The printing method of claim 5, wherein the billing information is generated by using a second application, and
wherein the second application transmits the billing information to the payment system by using any one of a payment application inside the image forming apparatus, a payment application outside the image forming apparatus, a payment apparatus, or a payment server, according to attributes of the payment method information.

7. The printing method of claim 1, further comprising:
providing the payment amount information to the user; and
receiving a request to proceed with payment from the user.

8. The printing method of claim 1, wherein the transmitting of the billing information comprises transmitting the billing information to the payment system corresponding to the payment method information included in the billing information.

9. The printing method of claim 1, further comprising transmitting, to the payment system, content job completion information according to completion of the job with respect to the content.

10. The printing method of claim 1, further comprising:
receiving information about a job related to the content and identification (ID) information from an external apparatus or a server connected to the external apparatus; and
transmitting the billing information to the payment system based on ID information received from the user corresponding to the received ID information.

11. The printing method of claim 10, wherein the transmitting of the billing information comprises, based on the ID information received from the user and the received ID information corresponding to each other:
displaying a job information list comprising the job information; and
based on the job information being selected from the job information list, transmitting the billing information based on the job information to the payment system.

12. An image forming apparatus comprising:
a communication unit to receive job information of content;
an input unit; and
a controller to:
control generation of payment amount information based on the job information of the content,
control transmission of the payment amount information to a payment system,
control reception, from the payment system, of preliminary payment information including available payment methods,
control reception, from a user using the input unit, of payment method information selected from the available payment methods,
control generation of billing information by using the payment amount information and the payment method information,
control transmission of the billing information to the payment system, and
control, upon receiving, from the payment system, payment completion information according to payment by the user, execution a job with respect to the content based on the job information of the content.

13. The image forming apparatus of claim 12, wherein the controller controls generation of the payment amount information by using a second application, and
wherein the second application generates the payment amount information by using the job information of the content received from a first application performing a job of the image forming apparatus.

14. A non-transitory computer-readable recording medium having recorded thereon instructions that, in response to execution by a computer, performs a printing method of an image forming apparatus, the non-transitory computer-readable recording medium comprising:
instructions to receive job information of content;
instructions to generate payment amount information based on the job information of the content;
instructions to transmit the payment amount information to a payment system;
instructions to receive, from the payment system, preliminary payment information including available payment methods;
instructions to receive payment method information selected from the available payment methods from a user;
instructions to generate billing information by using the payment amount information and the payment method information;
instructions to transmit the billing information to the payment system; and
instructions to upon receiving, from the payment system, payment completion information according to payment by the user, execute a job with respect to the content based on the job information of the content.

15. The non-transitory computer-readable recording medium of claim 14, wherein the instructions to generate the payment amount information comprise instructions to generate, by using a second application, the payment amount information by using the job information of the content received from a first application performing a job of the image forming apparatus.

16. The non-transitory computer-readable recording medium of claim 14, wherein the instructions to generate the payment amount information comprise:
instructions to determine a payment amount based on payment amount setting information corresponding to the job information of the content;
instructions to determine at least one payment apparatus usable by the user; and
instructions to generate the payment amount information based on the payment amount and the at least one payment apparatus.

17. The non-transitory computer-readable recording medium of claim 16, wherein the preliminary payment information further comprises at least one of an error condition of a payment device or prepayment usability.

18. The non-transitory computer-readable recording medium of claim 14, wherein the instructions to generate the billing information comprise:
- instructions to determine communication information corresponding to the payment method information; and
- instructions to generate the billing information by using the communication information and the payment amount information.

19. The non-transitory computer-readable recording medium of claim 18,
- wherein the billing information is generated by using a second application, and
- wherein the second application transmits the billing information to the payment system by using any one of a payment application inside the image forming apparatus, a payment application outside the image forming apparatus, a payment apparatus, or a payment server, according to attributes of the payment method information.

20. The non-transitory computer-readable recording medium of claim 14, wherein the instructions to transmit the billing information comprise instructions to transmit the billing information to the payment system corresponding to the payment method information included in the billing information.

* * * * *